(12) United States Patent
Seed et al.

(10) Patent No.: US 11,659,063 B2
(45) Date of Patent: May 23, 2023

(54) REQUEST PROCESSING IN THE SERVICE LAYER

(71) Applicant: Convida Wireless, LLC, Wilmington, DE (US)

(72) Inventors: Dale N. Seed, Allentown, PA (US); Gregory S. Sternberg, Mt. Laurel, NJ (US); Quang Ly, North Wales, PA (US); Rocco Di Girolamo, Laval (CA); Shamim Akbar Rahman, Cote St. Luc (CA); William Robert Flynn, IV, Schwenksville, PA (US); Catalina Mihaela Mladin, Hatboro, PA (US); Zhuo Chen, Claymont, DE (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 17/666,905

(22) Filed: Feb. 8, 2022

(65) Prior Publication Data

US 2022/0201095 A1    Jun. 23, 2022

Related U.S. Application Data

(63) Continuation of application No. 16/081,474, filed as application No. PCT/US2017/020690 on Mar. 3, 2017, now Pat. No. 11,290,559.

(Continued)

(51) Int. Cl.
  *H04L 67/5682* (2022.01)
  *H04L 67/62* (2022.01)
  *H04L 67/564* (2022.01)

(52) U.S. Cl.
  CPC ........ *H04L 67/5682* (2022.05); *H04L 67/564* (2022.05); *H04L 67/62* (2022.05)

(58) Field of Classification Search
  CPC .... H04L 67/5682; H04L 67/564; H04L 67/62
  (Continued)

(56) References Cited

U.S. PATENT DOCUMENTS

| 6,567,893 B1 | 5/2003 | Challenger et al. |
| 7,359,985 B2 | 4/2008 | Grove et al. |

(Continued)

FOREIGN PATENT DOCUMENTS

| CN | 101083586 A | 12/2007 |
| CN | 101083587 A | 12/2007 |

(Continued)

OTHER PUBLICATIONS

Chen, Hua, Marc Abrams, Tommy Johnson, Anup Mathur, Ibraz Anwar, and John Stevenson. "Wormhole caching with HTTP PUSH method for a satellite-based web content multicast and replication system." In Proceedings of the 4th International Web Caching Workshop, San Diego, CA. 1999. (Year: 1999).

(Continued)

*Primary Examiner* — Melvin H Pollack
(74) *Attorney, Agent, or Firm* — BakerHostetler

(57) ABSTRACT

Methods, systems, and devices may be used to support freshness-based processing of requests. Freshness-based processing may involve the service layer examining the age of stored content (e.g., resource representation) that it hosts and determining whether it is fresh enough to satisfy a retrieve or discovery request with a specified freshness requirement. If not fresh, the service layer can contact an application to refresh the content. In addition, freshness-based processing can also involve the service layer examining the semantic state of a command oriented update request to determine whether its state is fresh or not with respect to prior commands processed by the service layer. For example, the service layer may compare stored content (Continued)

associated with controlling a particular application (e.g. door is locked) and against the semantic content of an update request (e.g., unlock door) to determine whether it is the same (e.g., stale) or not (e.g., fresh). If fresh, the service layer can then re-target the update request to an application to have it perform the command (e.g., unlock door).

20 Claims, 24 Drawing Sheets

Related U.S. Application Data

(60) Provisional application No. 62/304,006, filed on Mar. 4, 2016.

(58) Field of Classification Search
USPC .......................................................... 709/219
See application file for complete search history.

(56) References Cited

U.S. PATENT DOCUMENTS

| | | | |
|---|---|---|---|
| 8,572,211 B2* | 10/2013 | Carpio | H04L 67/10 |
| | | | 709/219 |
| 9,232,342 B2 | 1/2016 | Seed et al. | |
| 9,361,369 B1 | 6/2016 | Bharat et al. | |
| 9,450,817 B1 | 9/2016 | Bahadur et al. | |
| 9,852,149 B1* | 12/2017 | Taylor | G06F 16/1844 |
| 9,984,369 B2* | 5/2018 | Li | H04N 21/4532 |
| 10,032,160 B2* | 7/2018 | Desai | G06Q 10/067 |
| 10,382,452 B1* | 8/2019 | Dawes | H04L 63/02 |
| 10,454,971 B2* | 10/2019 | Chalmers | H04L 63/105 |
| 2007/0180493 A1 | 8/2007 | Croft et al. | |
| 2008/0201331 A1 | 8/2008 | Eriksen et al. | |
| 2008/0235326 A1 | 9/2008 | Parsi et al. | |
| 2010/0057995 A1 | 3/2010 | Cao et al. | |
| 2012/0059847 A1 | 3/2012 | Yang | |
| 2012/0096116 A1 | 4/2012 | Mislove et al. | |
| 2013/0117413 A1 | 5/2013 | Kaneko et al. | |
| 2015/0055557 A1 | 2/2015 | Dong et al. | |
| 2015/0212812 A1* | 7/2015 | Tripathi | G06Q 10/0633 |
| | | | 717/120 |
| 2015/0220325 A1* | 8/2015 | Poon | G06F 8/35 |
| | | | 717/103 |
| 2015/0347542 A1* | 12/2015 | Sullivan | G06F 16/2455 |
| | | | 707/602 |
| 2015/0355897 A1 | 12/2015 | Ford et al. | |
| 2016/0014674 A1* | 1/2016 | Ahn | H04W 4/70 |
| | | | 455/456.1 |
| 2016/0087933 A1* | 3/2016 | Johnson | H04W 12/35 |
| | | | 709/245 |
| 2016/0110467 A1* | 4/2016 | Hern | G06F 16/9554 |
| | | | 235/375 |
| 2016/0127328 A1* | 5/2016 | Wickman | H04L 63/062 |
| | | | 713/168 |
| 2017/0041296 A1* | 2/2017 | Ford | G06F 21/64 |
| 2017/0099562 A1* | 4/2017 | Bhalla | H04W 4/50 |
| 2017/0359832 A1 | 12/2017 | Jacobs et al. | |
| 2018/0034777 A1* | 2/2018 | Jeong | H04W 4/70 |
| 2018/0146497 A1* | 5/2018 | Jeong | H04W 74/06 |
| 2019/0075184 A1 | 3/2019 | Seed et al. | |

FOREIGN PATENT DOCUMENTS

| | | |
|---|---|---|
| CN | 101127941 A | 2/2008 |
| CN | 101188625 A | 5/2008 |
| CN | 101656753 A | 2/2010 |
| CN | 102088485 A | 6/2011 |
| JP | 2013-541883 A | 11/2013 |
| JP | 2014-130614 A | 7/2014 |
| JP | 2016-503214 A | 2/2016 |
| TW | 201342852 A | 10/2013 |
| WO | 2013/142139 A2 | 9/2013 |
| WO | 2015/061290 A1 | 4/2015 |
| WO | 2016/074714 A1 | 5/2016 |

OTHER PUBLICATIONS

IEC International Standard, "Industrial Networks—wireless communication Network and Communication Profiles—ISA 100.11a" Oct. 2014, 1852 pages.

Li, Wen-Syan, Quoc Vu, Divakant Agrawal, Yoshinori Hara, and Hajime Takano. "PowerBookmarks: a system for personalizable Web information organization, sharing, and management." Computer Networks 31, No. 11-16 (1999): 1375-1389. (Year: 1999).

M. Vial, et al., "CoRE Internet-Draft, CoRE Mirror Server draft-vial-core-miorror-server-01", Apr. 2013, 20 pages.

OneM2M Technical Specification TS-0001 V2.3.0, "Functional Architecture" Aug. 2015, 352 pages.

OneM2M Technical Specification TS-0004-V1.0.1, "Service Layer Core Protocol Specification", Jan. 2015, 217 pages.

Wang et al., Design of Intelligent Data Acquisition and Monitoring System Based on Internet of Things, Telecom Information, Jul. 10, 2013.

Zou et al., Research and Implementation of Intelligent Agriculture System Based on Internet of Things, Internet of Things Technology, Jun. 15, 2014.

\* cited by examiner

REQUEST PROCESSING IN THE SERVICE LAYER

CROSS-REFERENCE TO RELATED APPLICATIONS

This application is a continuation of U.S. patent application Ser. No. 16/081,474 filed Aug. 31, 2018 which is the National Stage Application filed under 35 U.S.C. § 371 of International Application No. PCT/US2017/020690 filed Mar. 3, 2017 which claims the benefit of U.S. Provisional Patent Application No. 62/304,006, filed on Mar. 4, 2016, the contents of which are hereby incorporated by reference herein.

BACKGROUND

The oneM2M standard (oneM2M-TS-0001 oneM2M Functional Architecture-V2.6.0) under development defines a Service Layer called "Common Service Entity (CSE)". The Service Layer provides "horizontal" services that can be utilized by different "vertical" M2M systems and applications.

The CSE supports reference points as shown in FIG. 1. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying Network Service Entity (NSE). An NSE provides underlying network services to the CSEs, such as device management, location services and device triggering.

CSE contains multiple logical functions called "Common Service Functions (CSFs)", such as "Discovery" and "Data Management & Repository". FIG. 2 illustrates the CSFs currently defined by oneM2M Release 1.

oneM2M defines a <container> resource that represents a container for content instances to be stored in. oneM2M also defines a <contentInstance> resource. The <contentInstance> resource is a child resource of a <container> and used by applications to store content in the oneM2M service layer. The <contentInstance> resource supports a creationTime attribute which a CSE configures with a timestamp upon creation of the <contentInstance>. The <container> resource also support a <latest> child resource that can be targeted with a RETRIEVE request for the purposes of retrieving the latest <contentInstance> stored in the <container>.

oneM2M defines a <latest> child resource of a <container> resource. When a retrieve request addresses the <latest> resource, the Hosting CSE processes the request as a retrieve to the latest <contentInstance> resource among all existing <contentInstance> resources of the <container> resource.

oneM2M defines a createdAfter filter criteria condition that can be included in a retrieve or discover request to filter the retrieve or discovery results. For example, if used with a retrieve request targeting a particular resource, then the child resources of this targeted resource having a creationTime later than the specified createdAfter time will have their representations included in the retrieve response. Similarly, if used with a discover request targeting a particular resource, then the child resources of this targeted resource having a creationTime later than the specified createdAfter time will have their URIs included in the retrieve response.

With reference to FIG. 3, which illustrates an exemplary oneM2M AE pointOfAccess attribute, oneM2M defines a pointOfAccess for the <AE> resource type. The attribute is defined as a list of addresses for communicating with the registered AE over the Mca reference point via the transport services provided by the Underlying Network. The attribute is defined as a list of xs:string where each pointOfAccess entry in the list is represented as a string containing the underlying transport protocol scheme (e.g. http://) as well as the IP address and port or an fully qualified domain name (FQDN), e.g., myAE.com. For example, http://172.25.0.43:8000 or http://myAE.com.

oneM2M re-targeting involves a CSE generating or receiving a request, evaluating the request's URI to determine it is not targeting a resource hosted by the CSE, and then targeting the request to another entity (e.g., AE or another CSE) to be processed. oneM2M currently has limitations on the types of requests it can re-target to an AE. oneM2M supports re-targeting the following three types of notifications to AEs: 1) A notification to verify that an AE is reachable and able to receive notifications. This is done by a CSE during the creation of a new subscription and if the AE is configured to receive notifications for the subscription but was not the AE that created the subscription; 2) A notification to signal that a notification event for a subscription has been detected and the AE is configured to receive notifications for the given subscription; and 3) A notification to signal that a subscription which the AE had created has been deleted.

Methods are defined for interworking different Service Layers technologies with one another by defining an intelligent tunneling mechanism referred to as a Tunnel Anchor Point (TAP). In one example, a TAP may be supported within the resource structure by using one of the existing resources such as application resource or the container resource. A forwardingAddress attribute may be defined for the container resource. FIG. 4 is an exemplary illustration using ETSI M2M tunnel access point in association with a forwarding address attribute for the container resource.

FIG. 5 illustrates an exemplary CoRE Mirror Server Architecture. CoRE Mirror Server-IETF draft-vial-core-mirror-server-01, Apr. 10, 2013 defines the concept of a Constrained RESTful (CoRE) Mirror Server (MS). Resource constrained IoT devices (Sleepy Endpoints-SEP) can store and maintain representations of their resources within a Mirror Server and have the Mirror Server service requests on their behalf using the mirrored resource representations. This can prevent the Internet of Things (IoT) devices from being inundated with requests which can have adverse side effects such as draining a device's battery or congesting local area device networks.

SUMMARY

Disclosed herein are methods, systems, and devices that may be used for enabling support to freshness-based processing of requests. Freshness-based processing may involve the service layer examining the age of stored content (e.g., resource representation) that it hosts and determining whether it is fresh enough to satisfy a retrieve or discovery request with a specified freshness requirement. If not fresh, the service layer may contact an application to refresh the content. In addition, freshness-based processing may also involve the service layer examining the semantic state of a command oriented update request to determine whether its state is fresh or not with respect to prior commands processed by the service layer. For example, the service layer may compare stored content associated with controlling a particular application (e.g. door is locked) against the semantic content of an update request (e.g., unlock door) to determine whether it is the same or not. If fresh, the service layer may re-target the update request to an application to have it perform the command (e.g., unlock door).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
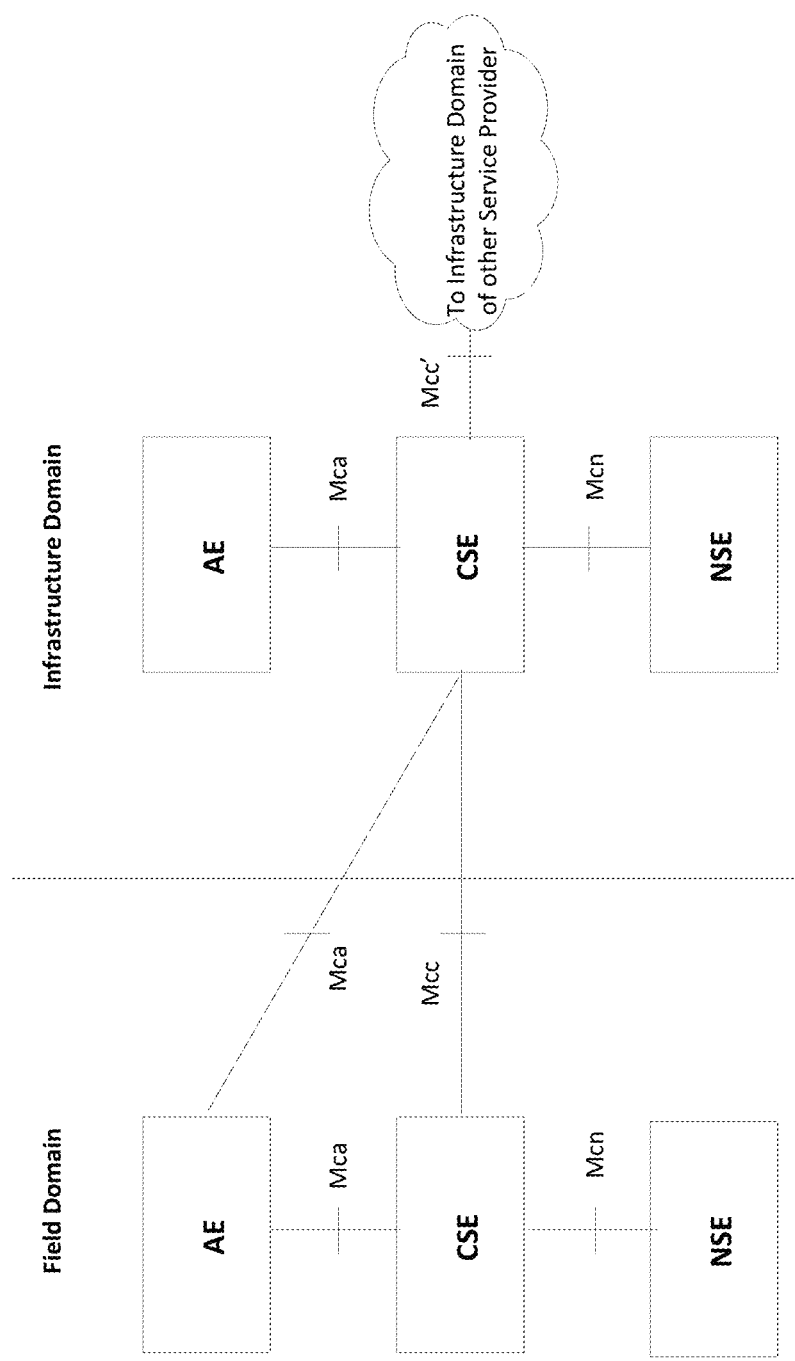
FIG. 1 illustrates an exemplary oneM2M Architecture.
Figure 2:
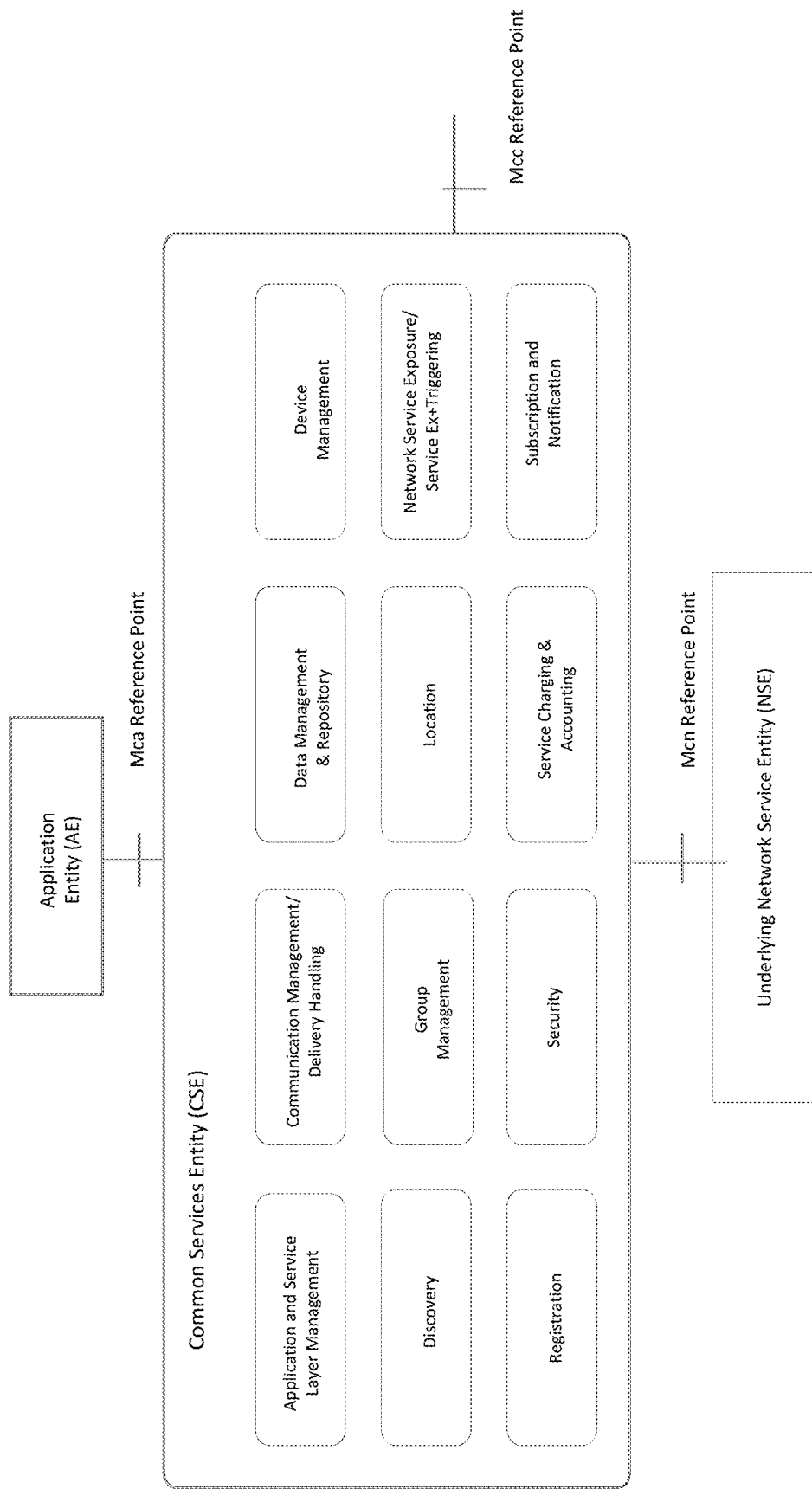
FIG. 2 illustrates an exemplary oneM2M Common Service Function.
Figure 3:
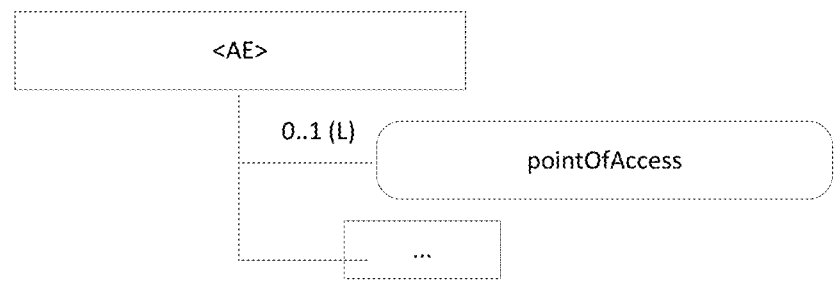
FIG. 3 illustrates an exemplary oneM2M AE pointOfAccess Attribute.
Figure 4:
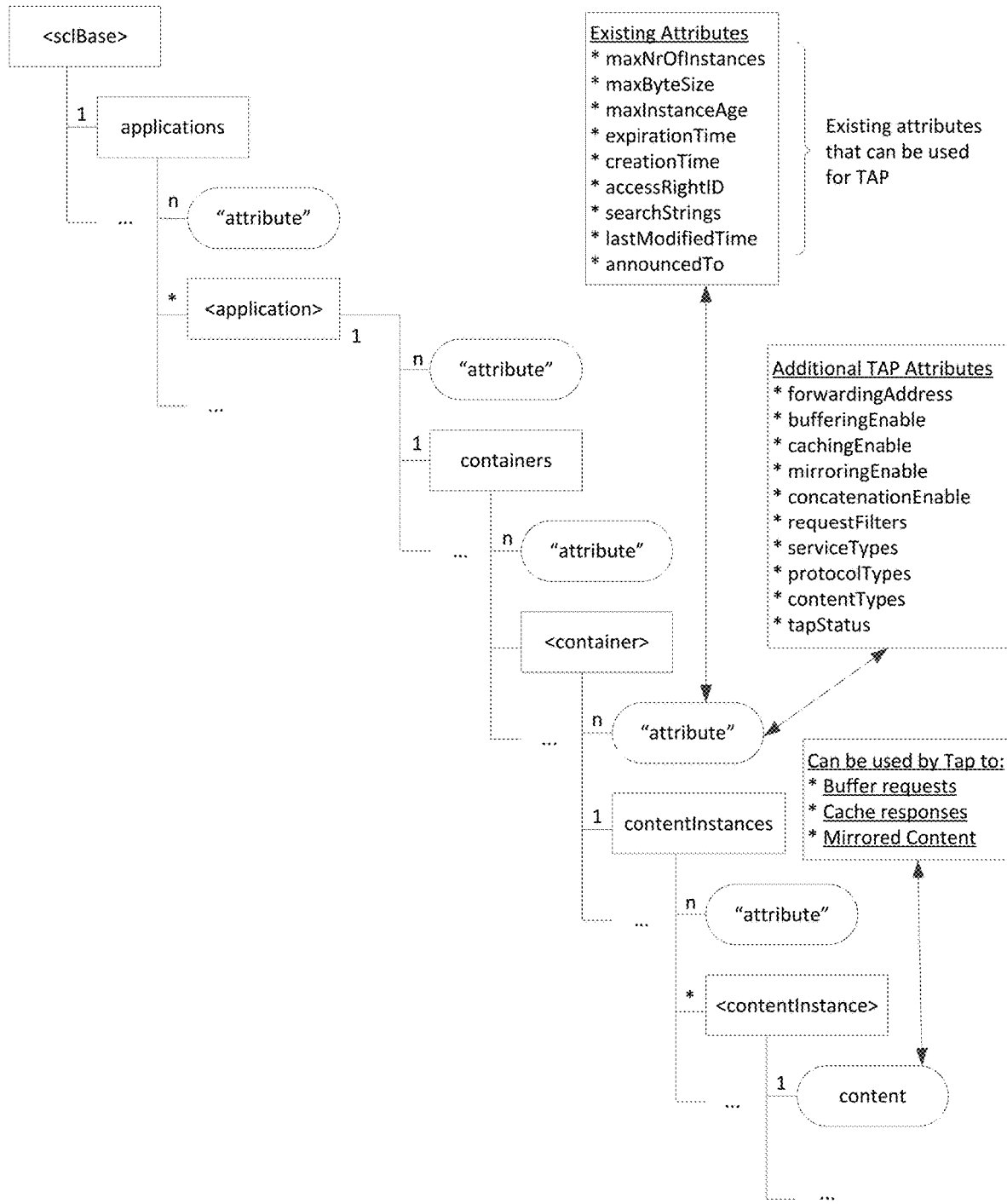
FIG. 4 illustrates an exemplary ETSI M2M Tunnel Access Point.
Figure 5:
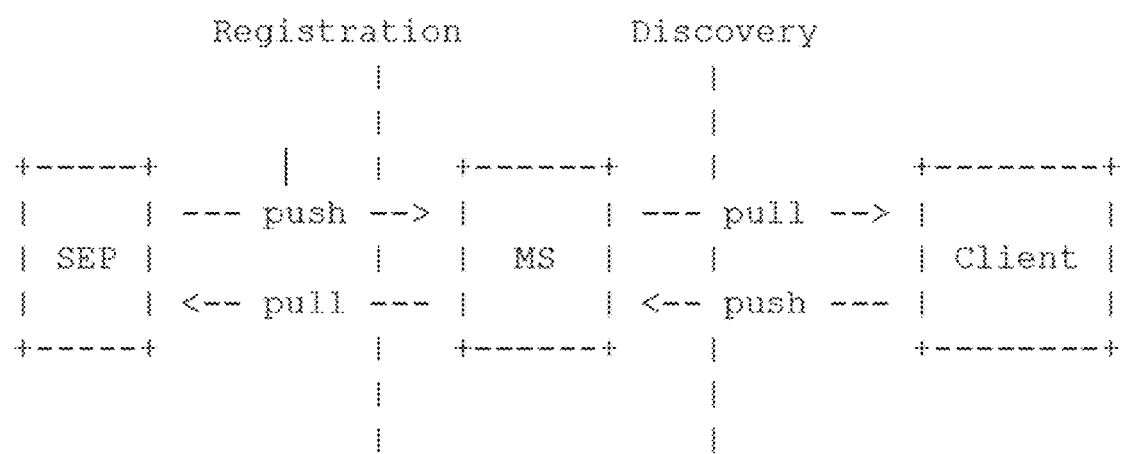
FIG. 5 illustrates an exemplary CoRE Mirror Server Architecture.

Disclosed herein are methods, systems, and devices that may be used for request processing in the service layer, for example. Freshness-based processing may involve the service layer examining the age of stored content (e.g. a resource representation) that it hosts and determining whether it is fresh enough to satisfy a retrieve or discovery request with a specified freshness requirement.

Conventional M2M/IoT Service Layer technologies do not effectively enable applications to discover or retrieve content hosted by the Service Layer in a manner that takes into account the content freshness requirements of the applications. Conventional M2M/IoT Service Layer technologies also do not effectively enable applications to re-target requests from one application to another in a manner that takes into account the freshness of the request. These shortcomings prevent Service Layer technologies from effectively supporting the types of use cases discussed herein, among others. This lack of support may result in IoT applications having to sacrifice and settle to use stale data or, worse yet, go without the fresh data they prefer or require. This lack of support may also result in added overhead to IoT devices for cases where increased numbers of content retrieval, content discovery, as well as other types of requests are initiated or re-targeted to the devices.

More specific examples of areas that may be made more effective or enabled in view of the conventional M2M/IoT Service Layer technologies are discussed below. In a first example, there may be a lack of support to allow a content sourcing application (hereinafter Content Sourcing App) to provide point-of-contact information to the Service Layer. The point-of-contact information may be used for the purpose of contacting the Content Sourcing App in the event that the Service Layer detects a fresh version of content preferred or required to service an incoming content retrieval or discovery request issued by a content requesting application (hereinafter Content Requesting App). Content Sourcing App is an application that provides content by creating a Service Layer hosted resource, while a Content Requesting App is an application that requests content by retrieving a Service Layer hosted resource created by a Content Sourcing App.

In a second example, there may be a lack of support to allow a request receiving application (hereinafter Request Receiving App) to provide point-of-contact information to the Service Layer which can be used to re-target a request, originating from a request initiating application (hereinafter Request Initiating App) and that is determined to be fresh by the Service Layer, to a Request Receiving App's point-of-contact. Without such a feature, a Request Receiving App and Request Initiating App may rely on an indirect communication scheme involving multiple Service Layer subscriptions and notifications in order to perform a single end-to-end request and response exchange. Request Receiving App is an application that may indirectly receive a request from a Request Initiating App via a Service Layer re-targeted request, while a Request Initiating App is an application that initiates a request to another application via re-targeting the request via a Service Layer resource.

In a third example, there may be a lack of support to allow an application (i.e., App) to subscribe to a Service Layer resource and receive content retrieval, content discovery, or other types of requests embedded within notification requests from the Service Layer. Likewise there may be a lack of support to allow an App to return a corresponding content retrieval, content discovery, or other types of responses back to the Service Layer embedded within the notification response. In a fourth example, there may be lack of support to allow a Service Layer to re-target a received content retrieval, content discovery, or other types of requests to an App to be serviced, and then upon receiving a response back from the App, create and maintain local copies of the results to aid in servicing future requests and to maintain history and tracking information of requests processed. In a fifth example, there may be a lack of support to allow a Service Layer to support re-targeting policies for a given resource that define rules such as entities authorized to re-target requests, types of requests allowed to be re-targeted, scheduled times when requests are allowed to be re-targeted and attributes of a resource that are allowed to be included in re-targeted requests.

Following are mechanisms that may assist in enabling or providing for more effective service layer request processing, among other things. A first exemplary mechanism may enable a Content Sourcing App to provide point-of-contact information to the Service Layer which can be used for the purpose of contacting the Content Sourcing App in the event that the Service Layer detects a fresh version of content is desired to service an incoming content retrieval or discovery request issued by a Content Requesting App. The point-of-contact may be formatted in several different formats such as an absolute URI, relative URI, or a oneM2M resource identifier, among other things. A second exemplary mechanism may include a procedure in which a Service Layer sends a content retrieval request to a Content Sourcing App to obtain a fresh version of content if the version hosted by the Service Layer is too old to meet a specified freshness defined within a content retrieval or discovery request issued by a Content Requesting App. This request may directly retrieve the content or the request may contain an address of a Service Layer resource which the Service Layer would like to be refreshed and also a priority or scheduled time by which the Service Layer requires or prefers the refreshed content. In response, the Content Sourcing App may appropriately schedule and prioritize when it may provide the Service Layer with a fresh version of content and perform the update to the specified address.

With continued reference to mechanisms that may assist in enabling or providing for more effective service layer request processing, a third exemplary mechanism may enable a Service Layer to send content retrieval or other types of requests to an App by embedding corresponding information elements in a service layer device trigger request that is delivered by an underlying network device trigger function. A fourth exemplary mechanism may enable an App to subscribe to a Service Layer resource and receive content retrieval, content discovery, or other types of requests embedded within notification requests from the Service Layer. Likewise, there may be support to allow an App to return a corresponding content retrieval, content discovery, or other types of responses back to the Service Layer embedded within the notification response. A fifth exemplary mechanism may enable a Request Receiving App to provide point-of-contact information to the Service Layer which may be used to re-target a request, originating from a Request Initiating App and that is determined to be fresh by the Service Layer, to a Request Receiving App's point-of-contact. A sixth exemplary mechanism may enable a Service Layer to re-target a received content retrieval, content discovery, or other types of requests to an App to be serviced, and then upon receiving a response back from the App, create and maintain local copies of the results to aid in servicing future requests and to maintain history and tracking information of requests processed.

With continued reference to mechanisms disclosed herein that may assist in enabling or providing for more effective service layer request processing, a seventh exemplary mechanism may enable the Service Layer to use as a trigger condition for it to service the incoming request in a non-blocking fashion, such as the detection that the Service Layer needs to re-target an incoming request to an App to process (e.g., obtain a fresh version of content). When servicing a re-targeted request in a non-blocking manner, the Service Layer may provide the requester with an acknowledgement containing an estimated time when fresh content will be available. An eighth exemplary mechanism may enable the Service Layer to support App re-targeting policies for a given resource that define rules such as entities authorized to re-target requests, types of requests allowed to be re-targeted, scheduled times when requests are allowed to be re-targeted, and attributes of a resource that are allowed to be included in re-targeted requests.

Also disclosed herein are oneM2M examples that may assist in enabling or providing for more effective service layer request, such as the freshness-based content discovery, content retrieval, and re-targeting concepts. In addition, disclosed herein are CoRE Mirror Server examples, such as for the freshness-based content discovery, content retrieval, and re-targeting concepts.

Figure 6:
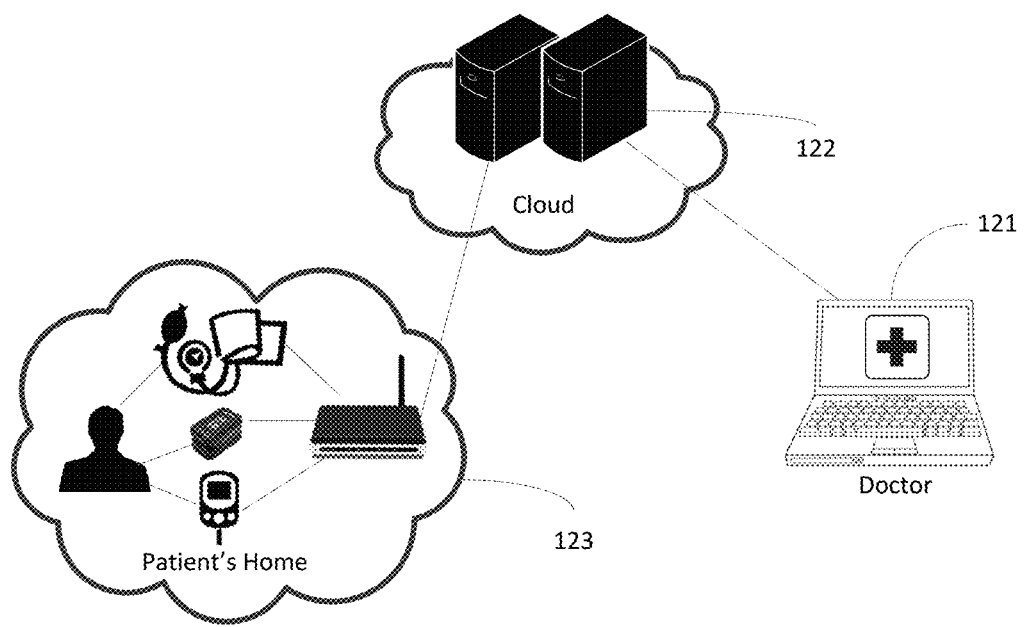
FIG. 6 illustrates an exemplary Network for Freshness-based Content Retrieval.

Below is a discussion of exemplary use cases that may give additional insight with regard to the methods, devices, or systems for request processing associated with the service layer. FIG. 6 illustrates an exemplary network for freshness-based content retrieval. As shown in FIG. 6, App 121 associated with a doctor is remotely monitoring health measurements (e.g., blood insulin, blood pressure, pulse oxygen, and heart rate) of a patient in the patient's home. These measurements are collected by one or more medical devices 123 associated with the patient. Medical devices 123 may be worn on the patient and may connect to a gateway in the home of the patient and the gateway may connect to service layer 122 (e.g., a cloud-based health service platform) that collects health measurements from various patient gateways and their connected devices. App 121 may be a web-based application to access service layer 122 to retrieve health measurements of the doctor's patients.

Hosted on the gateways, as well as the cloud service platform, may be IoT software services. These services provide functionality such as providing the capability to query and discover a particular patient's health measurements, securing a patient's health measurements in transit over the network, and aggregating multiple health measurements into a single message that may be more efficiently sent and scheduled across the network to minimize network loading, congestion, and cost.

To effectively monitor his patients, a doctor may prefer the capability to query and access health measurements for a given patient with a specified freshness (e.g., measurement must not be older than a specified period). Depending on the type of measurement and the particular patient, this freshness period may vary. The doctor, when using conventional systems, may be limited to accessing only the health measurements that his patients with their devices happen to measure and upload to their gateway or to the cloud. When using conventional systems, depending on the doctor's freshness preference, it is possible that some of these measurements may be too stale for the doctor's need and the doctor may have no other option but to wait for the next scheduled sensor measurement to be taken and uploaded. By the time this occurs, other measurement data from other patient sensors may become stale, making analysis of patient data as a whole difficult or unreliable.

To provide a better quality of care to his patients as well as allow himself to better manage his own time, what the doctor would prefer, in this use case, is to have access to health measurements that meet his freshness preference without having to wait for new measurements to be uploaded. Discussed in more detail herein are mechanisms that support an enhanced IoT service that triggers a particular patient device 123, or gateway or both to provide a fresh health measurement to service layer 122 when one is not already available in the cloud for application 121 of the doctor to access and which meets his specified freshness preference. Having this type of functionality allows the doctor to effectively have fresh on-demand access to his patient's health measurements while at the same time still leveraging the many benefits of hosting the health measurements in service layer 122, such as scalability, availability, cost, etc. By triggering a device or gateway to provide a fresh measurement when an existing measurement in service layer 122 does not already satisfy a particular request's freshness criteria, may result in a savings in the number of requests that need to be sent over the network, reduction in overhead on gateways or devices. In contrast, conventional triggering of a device (e.g., an end device or gateway device) to provide a measurement for each request may result in many more requests being sent over the network and added overhead on devices. Minimizing this overhead may be significant in IoT type deployments involving potentially large numbers of devices that may also be resource constrained in nature. The IoT service trigger allows a level of efficiency and optimization by not placing the onus on the application (e.g., App 121) to detect the case where a fresh reading is not available in the cloud and in turn target a device with a subsequent request to retrieve a fresh reading.

Figure 7:
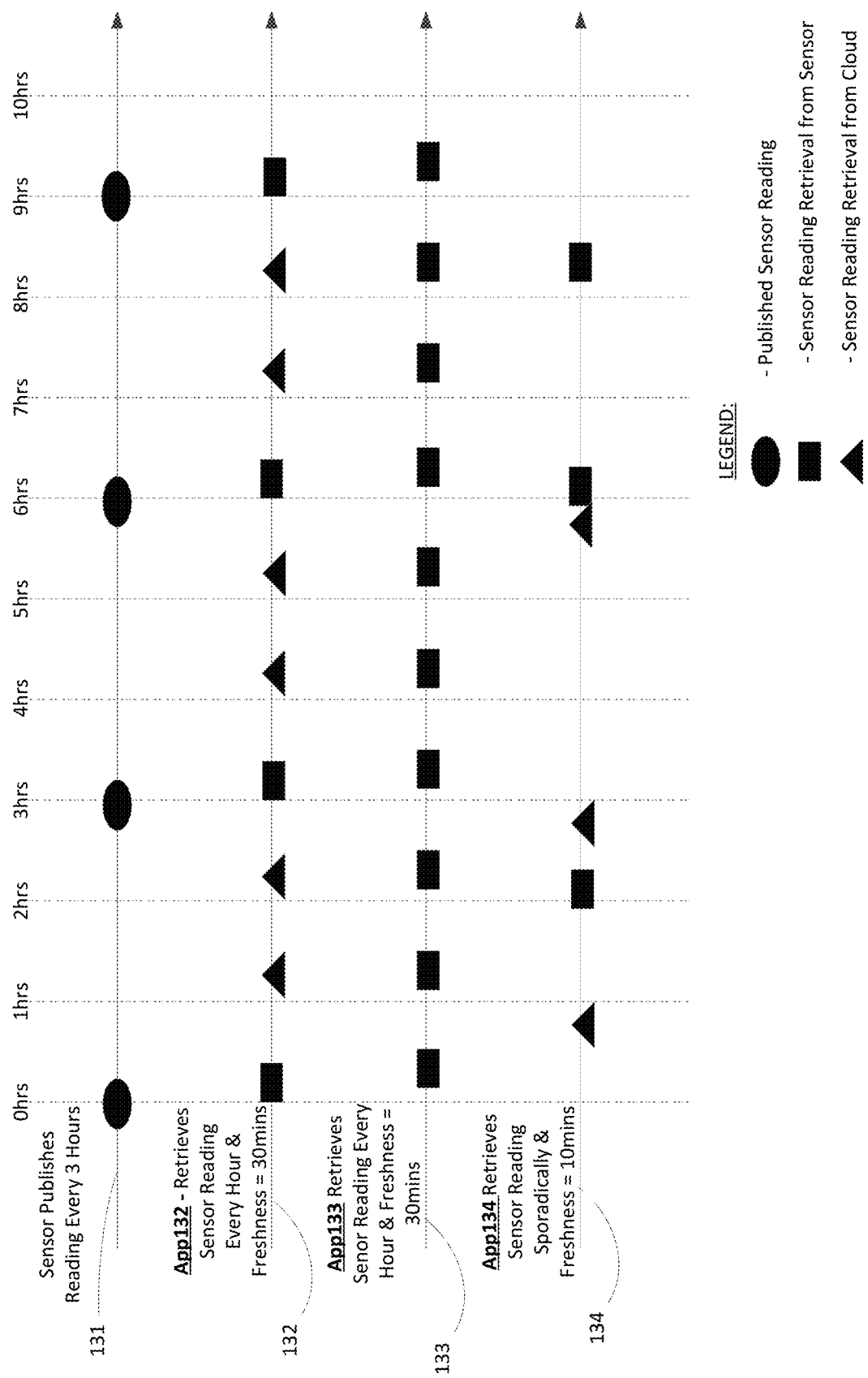
FIG. 7 illustrates an exemplary Freshness-based Content Retrieval Timeline.

FIG. 7 illustrates an exemplary freshness-based content retrieval timeline. FIG. 7 provides an example which highlights the potential savings of this freshness based content retrieval scheme in more detail. In this example, medical sensor device 131 publishes sensor readings once every three hours, as shown along the top line. The circles as shown indicate the published sensor readings of medical sensor device 131. These sensor readings are then retrieved by different apps (App 132, App 133, App 134). Apps 132 and 133 periodically retrieve the sensor readings once an hour with slightly different offsets and have a freshness preference that the sensor readings cannot be older than thirty minutes. The triangles in FIG. 7 indicate an operation that requires retrieving a sensor reading from medical sensor device 131 itself since there is not a fresh version cached in the cloud. The squares in FIG. 7 indicate an operation that does not require retrieving a sensor reading from medical sensor device 131, but instead a cached sensor reading that is fresh enough may be obtained from the cloud. App 134 may sporadically retrieve sensor readings and has a freshness preference that the sensor readings cannot be older than ten minutes. The example highlights the retrieval requests that may be serviced by the sensor readings hosted in the cloud (the aforementioned squares) versus those that require access to the sensor itself (the aforementioned triangles). From this example, 17 out of 26 readings may be serviced by the cached sensor readings hosted in the cloud and 9 out of 26 are serviced by the sensor being accessed since the cached versions in the cloud are not fresh enough to service the incoming requests. This illustrates the benefits of freshness based retrieval over directly accessing the sensor for each and every reading. Without freshness based retrieval, several of the requests in this example would have needed to be rejected by the service (i.e., cloud) due to a lack of fresh sensor readings that met the requirements of the incoming requests. Hence, freshness based retrieval may reduce the overhead on the sensor and network while at the same time providing Apps with the fresh sensor readings they prefer.

Figure 8:
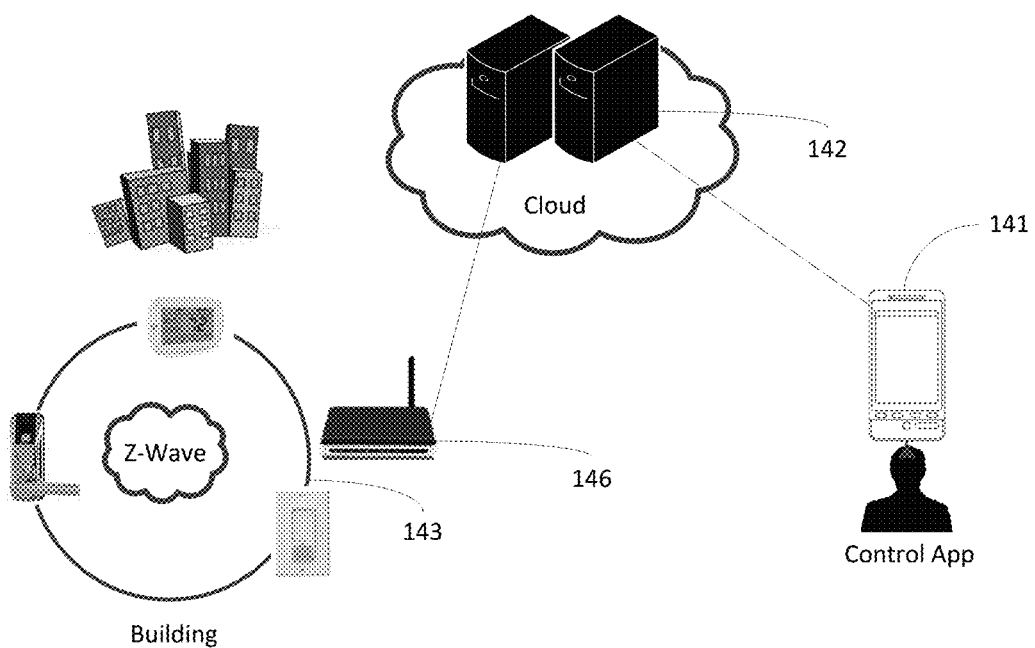
FIG. 8 illustrates an exemplary Network for Freshness-based Request Re-Targeting.

FIG. 8 illustrates an exemplary network for freshness-based request re-targeting. As shown in FIG. 8, control app 141 is communicatively connected with service layer 142. Service layer 142 is communicatively connected with building network 143. Building network 143 may have a gateway 146 connected to several different devices, such as electronic doors, electronic thermostats, and sensors, among other things. Control App 141 may be used to remotely control devices in building network 143 (e.g. turn lights on and off, control the thermostat and lock and unlock doors). The service layer 142 may be a cloud-based building management system that enables remote management and control of the devices of building network 143. Gateway 146, as well as the service layer 142, may host advanced IoT software services. These services may provide functionality such as providing the capability to query and discover particular devices, securing commands while in transit over the network (e.g., lock and unlock door commands), or semantic awareness and meaning of the commands issued to particular devices via requests that the IoT software services processes. Using control app 141 (e.g., a web-based control App), the devices in building network 143 may be accessed and controlled. For example, doors associated with building network 143 may be locked and unlocked remotely by initiating a command from the control app 141, through service layer 142, down to the gateway of building network 143 and ultimately to the door lock actuator device itself (not shown).

With continued reference to FIG. 8, to minimize overhead on the network, as well as on the gateway and devices, it may be desirable to only send requests initiated from the control app 141 down to the gateway and devices of building network 143 if the request is going to result in a change in semantic state of the device (e.g. lock and unlocked door or unlock a locked door). It may be desirable to support an enhanced IoT service within service layer 142 that has semantic awareness capability and is able to process incoming command type requests to detect which are fresh from a content semantics perspective such that they will result in a change in state of a device and only forward these commands down to the gateway and devices of building network 143. Requests that are stale in nature and are anticipated not to result in a change in state of a device of building network 143 may be filtered by the IoT service within service layer 142 and not sent to the gateway and devices of building network 143. Minimizing this overhead can be significant in IoT type deployments involving potentially large numbers of devices that may also be resource constrained in nature. Note, for cases where the stored state in an IoT service becomes out of sync with the state of the actual device of building network 143 (e.g., door is locked, but IoT service says it is unlocked), then it is possible to have mechanisms which override this proposed freshness based filtering functionality. For example, if service layer 142 received 5 consecutive requests to unlock a door, service layer 142 may forward the request to the device even though the stored state in the service layer indicates the command is not fresh. This may be triggered based on number of requests of a particular type to service layer 142, time period since a particular request, an override message, or a combination of the aforementioned, for example.

Figure 9:
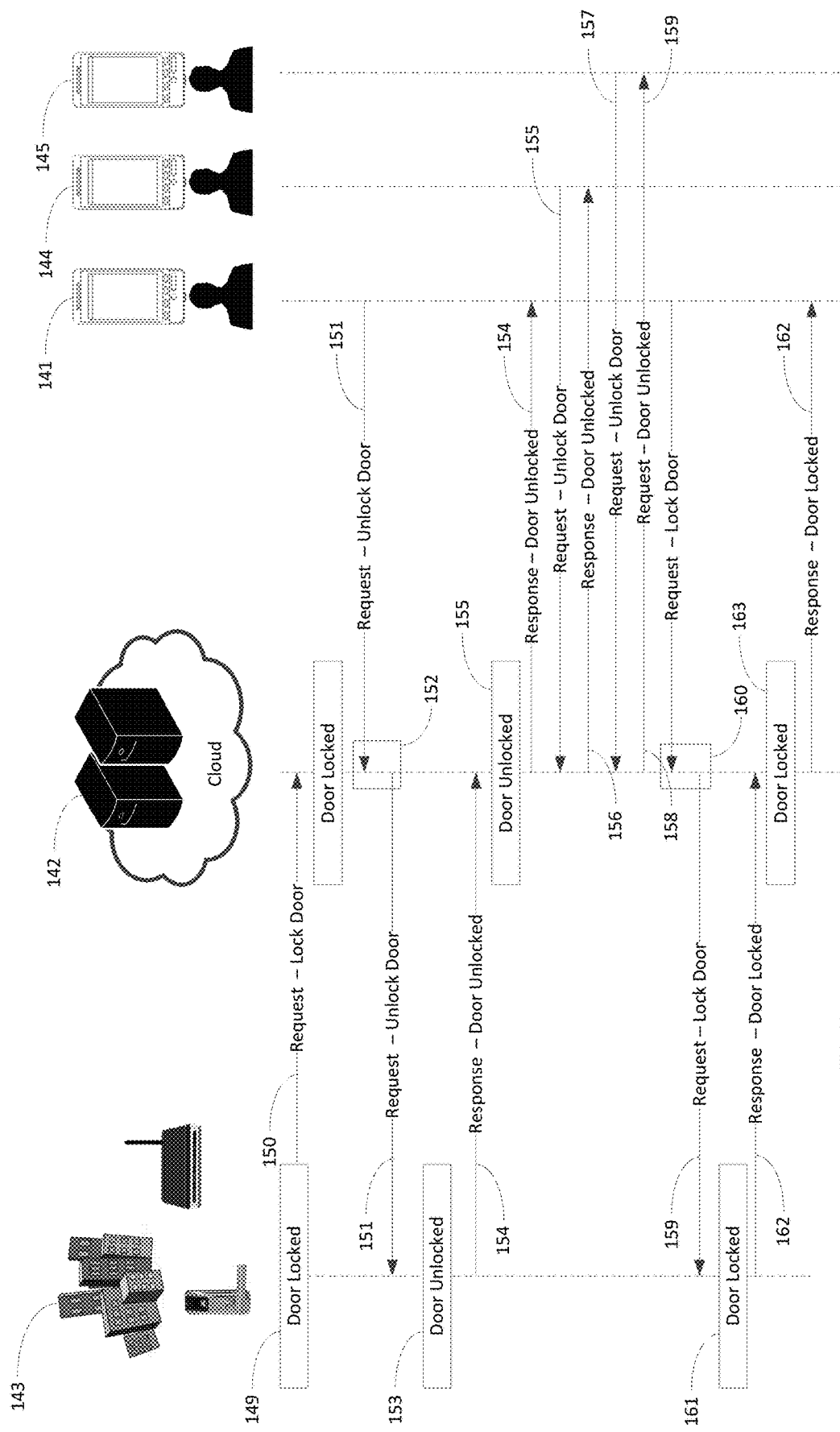
FIG. 9 illustrates an exemplary Freshness-based Request Re-Targeting Message Flow.

FIG. 9 illustrates an exemplary freshness-based request re-targeting message flow. FIG. 9 provides an example which highlights the potential savings of this freshness based request re-targeting scheme in more detail. At step 149 a door communicatively connected with building network 143 is in a locked state. A local request may have placed the door of building network 143 in the locked state. At step 150, a message is sent from building network 143 to indicate the locked state of the door in building network 143. In other words, the state of the door lock is published to service layer 142 (e.g., cloud) to keep synchronization between the state of the door lock and service layer 142. At step 151, control app 141 sends a request to unlock the door of building network 143 to service layer 142. The request of step 151 is re-targeted to the gateway and door lock to unlock the door. This is done since the request is deemed fresh (at step 152) because it is requesting to unlock a door which is locked. At step 153, the door of building network 143 is locked based on the request of step 151. At step 154, a message is sent to service layer 142 to indicate the door is locked and is saved at service layer 142 at step 155. At step 154, control app 141 may receive confirmation that the door is locked as requested in step 151. At step 155 and step 157, control app 144 and control app 145, respectively request for the door of building network 143 to be locked. At step 156 and step 158, control app 144 and control app 145, respectively receive a response that is indicative that the requests at step 155 and step 157 are stale, since they are attempting to unlock the door which is already unlocked. In this case, service layer 142, which maintains the state of the door lock, filters these requests and does not forward them to the gateway or door lock of building network 143. At step 159, control app 141 sends a request to lock the door of building network 143. The request of step 159 is re-targeted to the gateway and door lock to lock the unlocked door since the request is deemed fresh (at step 160). At step 161, the door is locked and response is sent to service layer 142 (at step 162), saved at service layer 142, and forwarded to control app 141. Freshness-based targeting may reduce the overhead on the devices and network while at the same time providing control app 141, control app 144, and control app 145 with the same functionality as if they were to communicate directly with the devices of building network 143 and send requests down to the devices of building network 143 itself.

It is understood that the entities performing the steps illustrated herein, such as FIG. 9-FIG. 12 and FIG. 14-FIG. 18, may be logical entities. The steps may be stored in a memory of, and executing on a processor of, a device, server, or computer system such as those illustrated in FIG. 21C or FIG. 21D. In an example, with further detail below with regard to the interaction of M2M devices, Content Sourcing App 202 or Content Requesting App of FIG. 10 may reside on M2M terminal device 18 of FIG. 21A, while Service Layer 204 of FIG. 10 may reside on M2M gateway device 14 of FIG. 21A or M2M service platform 22.

Figure 10:
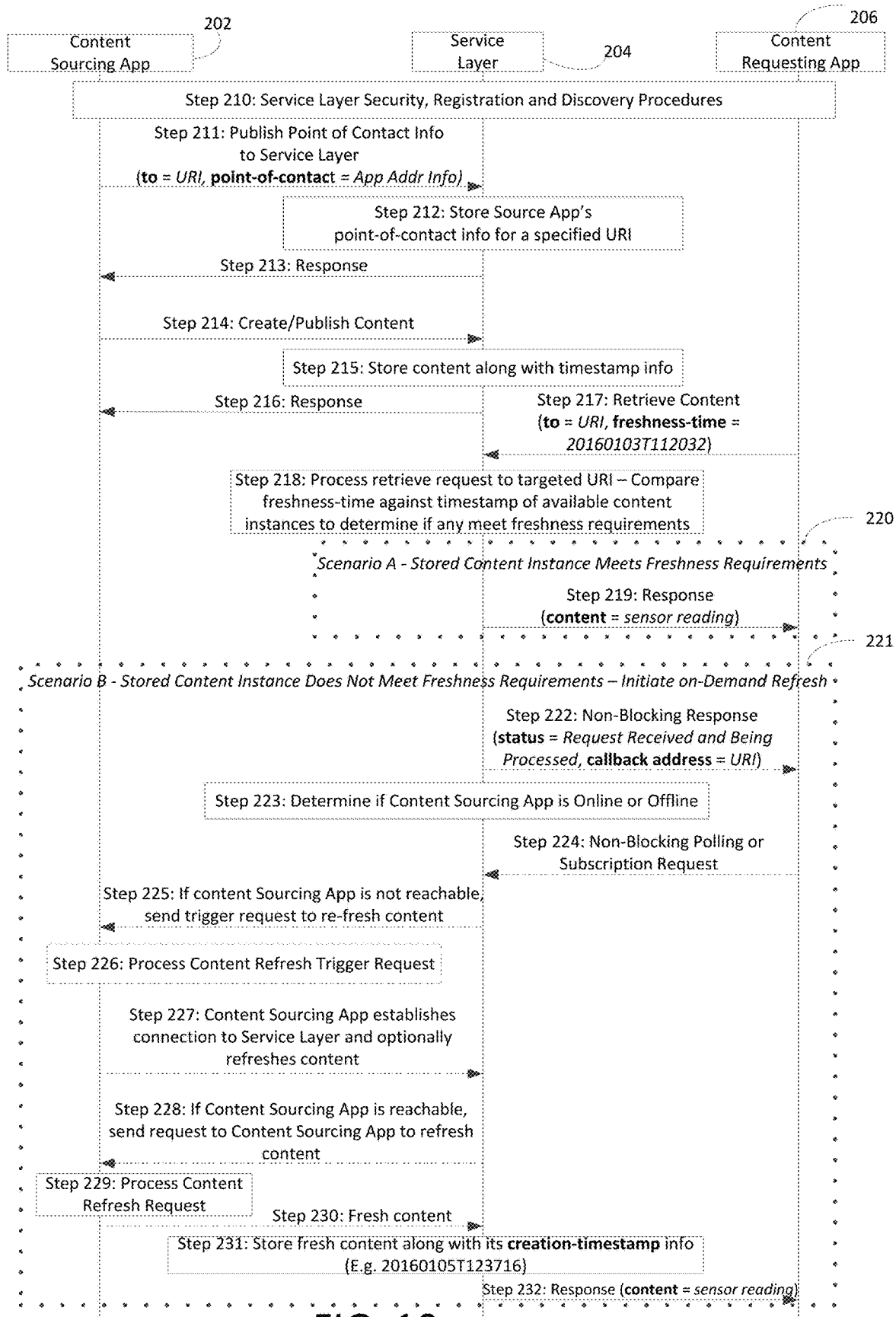
FIG. 10 illustrates an exemplary Freshness-based Content Retrieval Message Flow.

FIG. 10 illustrates an exemplary freshness-based content retrieval message flow. The method enables Content Requesting App 206 to retrieve content from Service Layer 204 that meets specified freshness preferences of Content Requesting App 206 even for the case where Service Layer 204 does not host such content. The message flow of FIG. 10 allows on-the-fly mechanisms to allow Service Layer 204 to detect when requested content is stale or not present and contact corresponding Content Sourcing App 202 for a fresh version. At step 210, Content Sourcing App 202 and Content Requesting App 206 authenticate and register with Service Layer 204. Content Requesting App 206 then discovers available Content Sourcing App 202.

With continued reference to FIG. 10, at step 211, Content Sourcing App 202 publishes point-of-contact information (e.g. a URI) to Service Layer 204. Content Sourcing App 202 may configure Service Layer 204 with one or more point-of-contacts. Content Sourcing App 202 may associate an individual point-of-contact with one or more resource(s) hosted by Service Layer 204. For example, Service Layer 204 may allow Content Sourcing App 202 to configure a point-of-contact attribute within a resource of Service Layer 204, which Content Sourcing App 202 periodically publishes a particular type of content to, such as sensor readings (e.g. a container resource that air quality readings are published to). At step 212 the point-of-contact information of step 211 is stored on Service layer 204. The point-of-contact information may be used by Service Layer 204 to contact Content Sourcing App 202 under different scenarios. For example, Service Layer 204 may contact Content Sourcing App 202 to obtain a fresh content instance (e.g., sensor reading) for scenarios such as Service Layer 204 receiving a request from Content Requesting App 206 to retrieve a sensor reading which Service Layer 204 does not currently have a locally hosted version of or all the versions are too old to satisfy the freshness preferences of Content Requesting App 206. For such scenarios, Service Layer 204 may use the point-of-contact information provided by Content Sourcing App 212 to send it a request and obtain fresh content. At step 213, Service Layer 204 may send a response to Content Sourcing App 202 to acknowledge receipt of the message of step 211.

At step 214, Content Sourcing App 202 publishes one or more content instances to Service Layer 204 resource specified by a targeted address (e.g. URI). Each received content instance may be stored by Service Layer 204 (e.g., step 215) and acknowledged via response (e.g., step 216). Content Sourcing App 202 may also provide a timestamp (e.g., timestamp=20160104T104017) of when the content instance (e.g., content=sensor reading) was generated or captured by Content Sourcing App 202. Service Layer 204 may also assign a timestamp to the content instance indicating the time the content instance was stored in Service Layer 204 versus the time the content was generated by Content Sourcing App 202. Both timestamps may be of value to Content Requesting App 206 searching for content based on the different timestamps.

At step 217, Content Requesting App 206 may issue a request to Service Layer 204 to fetch a particular type of content associated with Content Sourcing App 202. Content Requesting App 206 may specify Content Sourcing App 202 by a targeted address (e.g. a URI). Included in the request may be a specified freshness-time parameter (e.g., 20160103T112032) configured with time and date information that Content Requesting App 206 uses to specify that it prefers (or requires) content no older than the specified time and date.

At step 218, Service Layer 204 compares the specified time and date information within the freshness-time parameter of the request of step 217 against the timestamp of each applicable content instance hosted by Service Layer 204 and that is accessible via the targeted address specified in the request of step 217. From this comparison, Service Layer 204 determines if any of the applicable content instances hosted by Service Layer 204 have a timestamp newer than the specified freshness-time parameter. If none are found, Service Layer 204 may generate an event to signal that a fresh content instance is preferred or required from corresponding Content Sourcing App 202 in order to satisfy this request. This event in turn may be used by Service Layer 204 as a trigger to try and obtain a fresh content instance from Content Sourcing App 206 as defined by the procedures outlined in steps of block 221. The generation of the trigger can be qualified based on whether or not an applicable point-of-contact has been configured for Content Sourcing App 202 or not. If no point-of-contact has been configured, the trigger may be suppressed.

At step 219 (in block 220), if Service Layer 204 finds a content instance with a timestamp newer (i.e., within an acceptable threshold period) than the specified freshness-time parameter, then it may return a response to Content Requesting App 206 containing the content instance. In this case, Service Layer 204 does not need to initiate refreshing its locally stored content. Note, for cases where the requested content is not quite stale, but soon will be, Service Layer 204 may still choose to perform steps within block 221 to obtain a fresh content instance. "Not quite stale" may be based on many factors. Whether to continue to the steps of block 221 in this instance may be determined based on past responses (e.g., the presence or lack of "not quite stale" responses in previous periods, consecutive responses, or the like). Also for cases, where the requested content has recently become stale, Service Layer 204 may still choose to return the content to Content Requesting App 206 for the case where Content Sourcing App 202 is not available or does not have a fresh version of content available. In this case, Service Layer 204 may provide an indication to Content Requesting App 206 that the content did not meet the specified freshness preferences but was the only content available.

For the steps in block 221 of FIG. 10, if Service Layer 204 does not find a content instance with a timestamp newer than the specified freshness-time parameter, then it may return an acknowledgement to Content Requesting App 206 such that Content Requesting App 206 is not required to block and wait while Service Layer 204 attempts to obtain a fresh content instance from Content Sourcing App 202 (step 222). This acknowledgement message of step 222 may include a status to indicate that the request was received and is still being processed since Service Layer 204 did not have a locally hosted content instance that met freshness preferences of Content Requesting App 206. The acknowledgement message of step 222 may also include a service layer callback address (e.g., URI) that may be used by Content Requesting App 206 to retrieve or subscribe to receive a fresh content instance when it becomes available. This acknowledgement may also include an estimated time or delay with respect to the when Service Layer 204 expects to have a fresh version of the content ready (e.g., Service Layer 204 may be able to compute the expected time or delay based on past history of obtaining fresh content from a given Content Sourcing App 202). For example, Content Requesting App 206 may periodically poll or subscribe to this address and receive a fresh sensor reading when Service Layer 204 is able to obtain a fresh sensor reading from Content Sourcing App 202 or an error condition if Service Layer 204 is unsuccessful in obtaining a fresh sensor reading from Content Sourcing App 202. The acknowledgement may optionally include a stale version of the content as well such that it may be of some value to Content Requesting App 206 while it waits for the fresh content. For the case where Content Requesting App 206 specifies a freshness time in the future, Service Layer 204 may process this request in a non-blocking manner. Service Layer 204 may wait until the specified freshness time elapses and then check whether it hosts content to service the request. If it does, Service Layer 204 may respond back to Content Requesting App 206 with the content. Otherwise, it may perform steps 223 and 225-232. Alternatively, Service Layer 204 may choose to process the request in a blocking manner in which case it would not return an acknowledgement to Content Requesting App 206 in this step. Instead Service Layer 204 would hold off responding to Content Requesting App 206 until Step 232 of FIG. 10. The trigger to allow Service Layer 204 to determine whether a request is processed in a blocking or non-blocking manner may be based on whether or not Service Layer has fresh enough data to process the request. In the case that it does not and initiates a request to Content Sourcing App 202, Service Layer 204 may choose to process the request in a non-blocking manner. Otherwise, Service Layer 204 may choose to process the request in a blocking manner. Alternatively, as shown in step 124, Content Requesting App 124 may explicitly specify in the request whether Service Layer 204 is to use blocking or non-blocking.

With continued reference to FIG. 10, at step 123, if Content Sourcing App 202 is not reachable via a request of Service Layer 204 when Service Layer 204 is trying to obtain a fresh content instance, Service Layer 204 may initiate a device trigger operation to have Content Sourcing App 202 re-establish connectivity to Service Layer 204 such that it may obtain a fresh content instance. The details of how Service Layer 204 makes this reachability determination may be done in several different ways, such as for Service Layer 204 to support reachability state information for Content Sourcing App 202 which the device updates to indicate when it is reachable or not reachable to Service Layer 204 as defined by oneM2M-TS-0001 oneM2M Functional Architecture-V2.6.0, which is incorporated by reference in its entirety. Service Layer 204 may condition whether or not to perform freshness-based content retrieval for a given request based on policies such as whether or not Content Retrieving App 206 is authorized to use freshness services supported by Service Layer 204.

At step 225 of FIG. 10, if Content Sourcing App 202 is not reachable, Service Layer 204 may generate a device trigger request to initiate Content Sourcing App 202 to re-establish its connection to Service Layer 204 such that it may receive requests from Service Layer 204. The details of how Service Layer 204 delivers the device trigger to Content Sourcing App 202 may occur in multiple ways, for example one such delivery method may be to make use of underlying network trigger functionality such as 3GPP SMS-based triggering. As part of a trigger request payload, Service Layer 204 may embed additional information to indicate to Content Sourcing App 202 that the reason for this trigger is to re-fresh Service Layer 204 with new content (e.g., a sensor reading). This additional information may include one or more of the following: a trigger type parameter (e.g., 'Content Requested'), a Service Layer content identifier or address parameter indicating the particular content that refreshing is preferred (or required), a priority parameter indicating the urgency in which Service Layer 204 desires or otherwise needs the requested content, a freshness-time parameter indicating that the content must be no older than the specified date and time in case Content Sourcing App 202 supports buffering of content instances, or a schedule parameter indicating the date and time of when Service Layer 204 prefers Content Sourcing App 202 to provide it with a fresh version of the content. For the priority parameter, Service Layer 204 may derive a priority based on a specified priority of the incoming request, a priority affiliated with Content Requesting App 206's subscription or account, the age or staleness of the content (e.g., relative time past the specified freshness time), or the popularity or level or interest in the content (e.g., how many different Content Requesting Apps and the frequency pattern of requests to the content). For the schedule parameter, Service Layer 204 may derive a schedule based on the specified freshness-time of the current request (e.g., freshness-time in request was specified with a time in the future) or alternatively the derived schedule may be based on past history of requests for the content (e.g., detect a pattern of past requests and use this pattern to derive an estimated schedule for future requests). The message of step 124 may include the following information: (type=ContentRequest, addr=URI, priority=high, freshness-time=20160103T112032, schedule=20160103T112132).

At step 226, upon receiving the device trigger request, Content Sourcing App 202 may process and detect it is a request for content by analyzing the specified trigger type parameter. If Content Sourcing App 202 supports more than one type of content, it may check the content identifier or address parameter to detect which type of content is being requested by Service Layer 204. Content Sourcing App 202 may then check the priority or schedule parameters to determine when it must provide Service Layer 204 with the fresh content. Content Sourcing App 202 may also check the freshness-time parameter to see if there is a preferred freshness date or time of the content specified. If one is specified, Content Sourcing App 202 may verify that any content instance that it provides was not generated before this date and time.

A step 227 of FIG. 10, in response to a device trigger request initiated by Service Layer 204, Content Sourcing App 202 may re-establish its connection to Service Layer 204 and update its reachability state to notify Service Layer 204 that it is now reachable and able to receive requests initiated by Service Layer 204. Content Sourcing App 202 may also include a fresh version of content (e.g., sensor reading) in the device trigger response if available or alternatively a status indicating that a fresh version is not available at this time. In doing so, this may optimize the overall procedure by saving a separate request. Alternatively, Content Sourcing App 202 may initiate a separate request to Service Layer 204 (following the device trigger request and response) to update Service Layer 204 with fresh content if available or alternatively a status indicating that a fresh version of content is not available at this time. Content Sourcing App 202 may use the address information embedded in the device trigger request as the target of this new request. The message of step 227 may include the following information: (to =URI, content=sensor reading, timestamp=20160105T091434).

With continued reference to FIG. 10, at step 228, if Content Sourcing App 202 is reachable and Service Layer 204 has not received a fresh content instance from Content Sourcing App 202 by another mechanism (such as the device trigger-based mechanism described herein), then Service Layer 204 may alternatively initiate a separate request itself to Content Sourcing App 202, explicitly requesting a fresh content instance. This request may be delivered to Content Sourcing App 202 using one of several different types of requests. Service Layer 204 may initiate a retrieve request targeting the point-of-contact specified by Content Sourcing App 202 in step 211 through step 213. Alternatively, Service Layer 204 may initiate a notification request to Content Sourcing App 202 that targets a notification address configured in a prior subscription request or to the point-of-contact specified in step 211 through step 213. Within this notification, Service Layer 204 may include similar types of information as defined in the trigger request discussed herein (e.g., step 225 through step 227). The notification of step 228 may include one or more of the following: a reason (e.g., triggering event) for this notification (e.g., Content Refresh Request), a Service Layer content identifier or address parameter indicating the particular content that refreshing is preferred, a priority parameter indicating the urgency in which Service Layer 204 desires or otherwise needs the requested content, a freshness-time parameter indicating that the content must have been created no earlier than the specified absolute date and time or relative time since the content was created in case Content Sourcing App 202 supports buffering of content instances, or a schedule parameter indicating the date and time of when Service Layer 204 prefers Content Sourcing App 202 to provide it with a fresh version of the content. For the priority parameter, Service Layer 204 may derive a priority based on a specified priority of the incoming request, a priority affiliated with Content Requesting App 206's subscription or account, the age or staleness of the content (e.g., time past the specified freshness time), or the popularity or level or interest in the content (e.g., how many different Content Requesting Apps and the frequency pattern of requests to the content). For the schedule parameter, Service Layer 204 may derive a schedule based on the specified freshness-time of the current request (e.g., freshness-time in request was specified with a time in the future) or alternatively the derived schedule may be based on past history of requests for the content (e.g., detect a pattern of past requests and use this pattern to derive an estimated schedule for future requests). The message of step 228 may include the following information: (type=ContentRefresh, addr=URI, priority=high, freshness-time=20160103T112032, schedule=20160103T112132).

At step 229 of FIG. 10, upon receiving the request of step 228 from Service Layer 204, Content Sourcing App 202 may process and detect the type of request (e.g. retrieve or notify). If the request is a retrieve, Content Sourcing App 202 may analyze the specified address in the request to determine which content is being requested and in turn prepare a content instance that it wants to return to Service Layer 204 response if available or alternatively a status indicating that a fresh version is not available at this time. If the request is a notification, Content Sourcing App 202 may detect it is a request for content by analyzing the specified notification type parameter. If Content Sourcing App 202 supports more than one type of content, it may check the content identifier or address parameter to detect which type of content is being requested by Service Layer 204. It may then check the priority or schedule parameters to determine when it must provide Service Layer 204 with the fresh content. It may also check the freshness-time parameter to see if there is a required freshness date or time of the content specified. If one is specified, Content Sourcing App 202 may verify that any content instance that it provides was not generated before this date and time.

At step 230, Content Sourcing App 202 may update Service Layer 204 with a fresh content instance or a status indicating that a fresh content instance is not available at this time in one of several methods. If Service Layer 204 issues an explicit retrieve request to Content Sourcing App 202 requesting a fresh content instance, then Content Sourcing App 202 may include a fresh content instance in the retrieve response. If Service Layer 204 issues a notification to Content Sourcing App 202 indicating that a fresh content instance is desired or otherwise needed, then Content Sourcing App 202 may include a fresh content instance in the notification response or alternatively Content Sourcing App 202 can follow-up with a separate request (e.g., Create request) to create a fresh content instance in Service Layer 204. The message of step 230 may include the following information: (to =URI, content=sensor reading, timestamp=20160105T091434).

With continued reference to FIG. 10, at step 231, if a fresh content instance is successfully published to Service Layer 204, then Service Layer 204 may store a local version of the fresh content instance such that it may be leveraged to service future requests or be used for purposes such as charging and analytics. Service Layer 204 may also optionally assign a corresponding timestamp to keep track of when the content instance was published to Service Layer 204. At step 232, if a fresh content instance is successfully published to Service Layer 204, then it is returned to Content Requesting App 206, otherwise if fresh content is not available, Service Layer 204 may return an error or alternatively it may return the most recent (but stale) version of the content along with an indication of its staleness (e.g., time it was created) since this still may be of some use.

Figure 11:
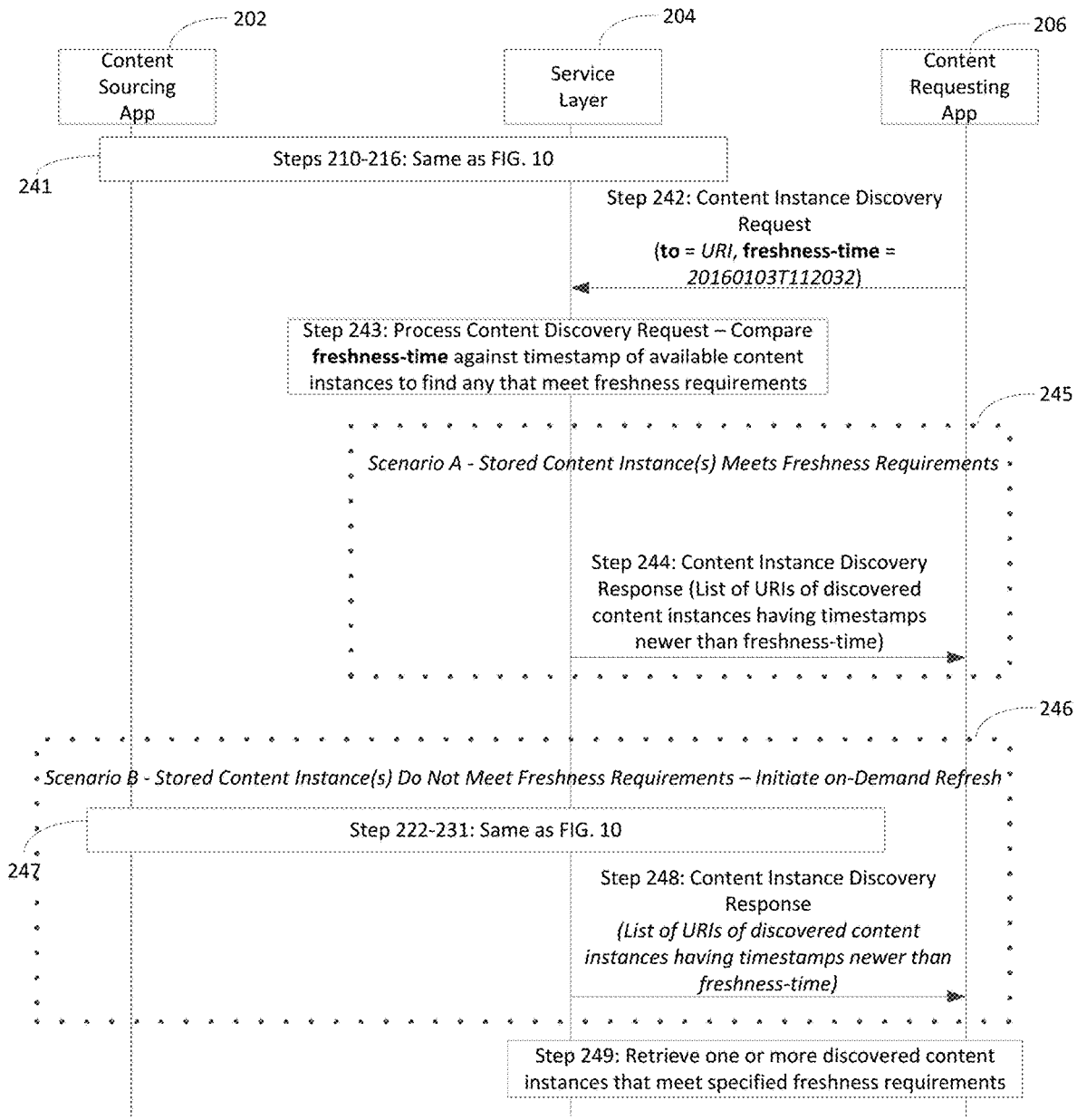
FIG. 11 illustrates an exemplary Freshness-based Resource Discovery Message Flow.

FIG. 11 illustrates an exemplary freshness-based resource discovery message flow. Content Requesting App 206 discovers content from Service Layer 204 that meets Content Requesting App 206's freshness preferences even for the case where Service Layer 204 does not host such content. The procedure defines an on-the-fly mechanism to allow Service Layer 204 to detect when content is stale or not present in Service Layer 204. When this occurs, Service Layer 204 may in turn contact the corresponding Content Sourcing App 202 to have it re-fresh the content such that Service Layer 204 my include a reference to this content in the discovery response it returns to Content Requesting App 206.

Steps in block 241 of FIG. 11 function the same as step 210 through step 216 of FIG. 10. At step 242 of FIG. 11, Content Requesting App 106 issues a request to Service Layer 204 to discover a particular type of content associated with Content Sourcing App 202. Included in the request is a specified freshness-time parameter configured with time and date information that Content Requesting App 206 uses to specify that it desires to discover content no older than the specified time and date. The request of step 242 may also include other discovery filter criteria as well (e.g. type of content).

At step 243, Service Layer 204 compares the specified time and date information within the freshness-time parameter of the content discovery request of step 242 against the timestamp of each applicable content instance hosted by Service Layer 204. From this comparison, Service Layer 204 determines if any of the applicable content instances hosted by Service Layer 204 have a timestamp newer (i.e., within an acceptable threshold period) than the specified freshness-time parameter. If none are found, Service Layer 204 may generate an event to signal that a fresh content instance is preferred from a corresponding Content Sourcing App 202 such that Service Layer 204 may include a reference (e.g., URI) to this content in the discovery response it sends to Content Requesting App 206 and that Service Layer 204 has the content ready and available when Content Requesting App 206 sends a subsequent request to access the content. This event may be used by Service Layer 204 as a trigger to try and obtain a fresh content instance from Content Sourcing App 202 as outlined by the flow of block 221 of FIG. 10 and corresponding description. The generation of the trigger may be qualified based on whether or not an applicable point-of-contact has been configured for Content Sourcing App 202 or not. If no point-of-contact has been configured, the trigger may be suppressed. Service Layer 204 may support access control policies to qualify which Content Requesting Apps 206 are allowed to make use of this freshness based discovery feature as requested by step 242 and processed in step 243. Whether Content Requesting App 206 has privileges for freshness based discovery defined for a given targeted content instance may be used to qualify whether Service Layer 204 subsequently initiates a freshness-based retrieve request to Content Sourcing App 202.

At step 244 of block 245, if Service Layer 204 finds a content instance with a timestamp newer (i.e., within an acceptable threshold period) than the specified freshness-time parameter, then it may return a response to Content Requesting App 206 that includes a reference (e.g., URI) to this content in the discovery response. In this case, Service Layer 204 may not initiate refreshing its locally stored content. However, Service Layer 204 may choose to still refresh its content even for this case. For example, if the content is close to becoming stale, Service Layer 204 may detect this condition and choose to proactively refresh the content. Step 222 through step 231 and accompanying description of FIG. 10 may be the same as the steps in block 247 of FIG. 11. At step 248, if a fresh content instance is successfully published to Service Layer 204, then a reference (e.g. URI) to this content is returned in the discovery response otherwise an error may be returned instead. At step 249, Content Requesting App 206 processes the discovery response and may subsequently retrieve one or more of the discovered content instances (based on the specified references in the response) that meet its freshness requirements.

Figure 12:
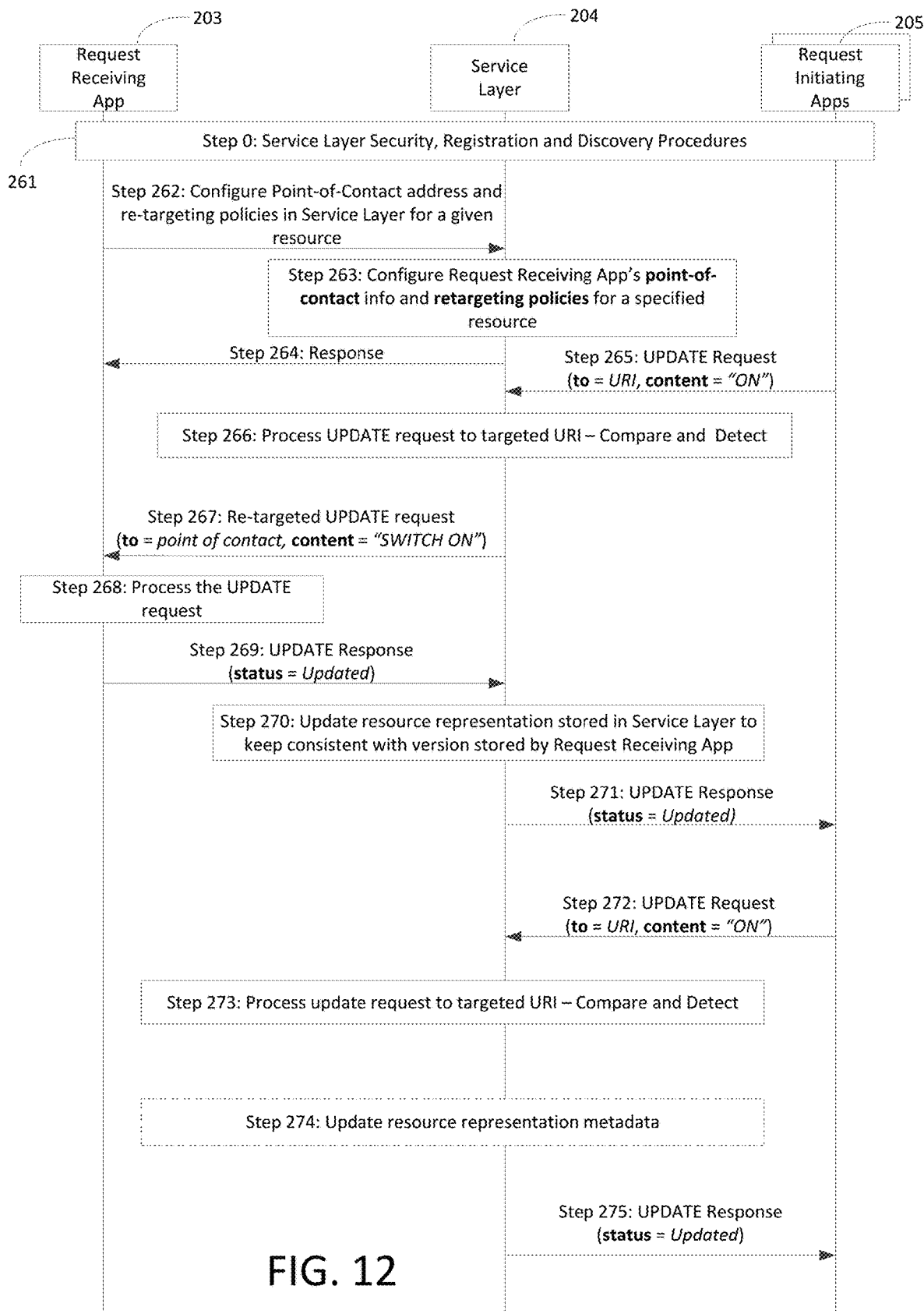
FIG. 12 illustrates an exemplary Freshness-based Request Re-Targeting Message Flow.

FIG. 12 illustrates an exemplary freshness-based request re-targeting message flow. Request Receiving App 203 may configure Service Layer 204 to re-target certain requests it receives for a given resource to Request Receiving App 203 to be serviced. This re-targeting functionality has a level of transparency which allows requests and responses to flow end-to-end through Service Layer 204 between Request Initiating App 205 and Request Receiving App 203. Without such a feature, Request Receiving App 203 and Request Initiating App 205 may rely on a less effective or preferred indirect communication scheme involving multiple Service Layer subscriptions and notifications in order to perform a single end-to-end request and response exchange.

For example, the method of FIG. 12 may be used to re-target UPDATE requests received by Service Layer 204 to Request Receiving App 203. This may be useful for scenarios where Request Receiving App 203 is an actuator type of device (e.g., light switch). The type of requests that Request Receiving App 203 desires to be re-targeted to may be configured by a programmable service layer re-targeting policy. Other types of requests such as CREATEs (e.g., creation of a child resource), RETRIEVEs, DELETEs, and SUBSCRIBEs may also be applicable to this procedure as shown in FIG. 12, but have not been explicitly shown to keep the procedure concise. In addition, other policies may qualify when Service Layer 204 re-targets a request to Request Receiving App 203. For example, Service Layer 204 may support filtering of requests and only re-target a sub-set of requests to Request Receiving App 203 for a given targeted resource (e.g., only re-target requests from a specific Request Initiating App 205). Service Layer may also support a policy to control which attributes in a resource representation Service Layer 204 will (and will not) analyze when performing freshness filtering and re-targeting. This feature may allow Request Receiving App 203 to configure Service Layer 204 to focus its comparison on attributes which have importance to Request Receiving App 203 and ignore the others. Yet another type of re-targeting policy may define which attributes are to be included in a re-targeted request and which ones are not. Yet another type of re-targeting policy may define specific Content Requesting Apps 206 with privileges to have their requests re-targeted to a Content Sourcing App 202.

A type of retargeting that Service Layer 204 may perform is freshness based re-targeting. When receiving an UPDATE request to a targeted resource, Service Layer 204 my compare the current representation of the resource to be updated with the representation provided in the UPDATE request. If they are identical, then Service Layer 204 may infer that the current resource is fresh and up to date and choose not to re-target the UPDATE request to Request Receiving App 203 in order to minimize the number of requests and load on Request Receiving App 203. In such cases, Service Layer 204 may return a status code to Request Initiating App 205 notifying it of this situation. Conversely, if the compared representations are not identical, then Service Layer 204 may re-target the UPDATE request to Request Receiving App 203 for it to process. In addition Service Layer 204 may also update its local version of the resource to maintain synchronization with Request Receiving App 203's representation and leverage the updated version for potential future requests. Note, this freshness based re-targeting feature as shown in FIG. 12 (and also FIG. 8-FIG. 9) may be supported as a configurable option that may be of value to some use cases such as those involving resource constrained IoT devices and networks that may receive duplicate requests over time. For other use cases, where duplicate requests may have functional importance, this feature may be disabled. One exemplary way to selectively enable or disable the feature is by using the point-of-contact (e.g., if no point-of-contact is configured that re-targeting is disabled). A second exemplary way to selectively enable or disable the feature is by using a re-target policy.

At step 261, Request Receiving App 203 and Request Initiating App 205 authenticate and register with the Service Layer 204. Request Initiating App 205 then discovers Request Receiving App 203. At step 262, Request Receiving App 203 send a message comprising a configure point-of-contact address and re-targeting policies in Service Layer 204 for a given resource. The message of step 262 may include one or more of the following: (to=URI, point-of-contact=App Addr Info, retargetPolicies=policies). At step 263, Service Layer 204 configures the point-of-contact info and retargeting policies associated with Request Receiving App 203 for a specified resource. At step 264, Service Layer 204 may a response that may acknowledge receipt of the message of step 262, among other things. Step 262 through step 264 of FIG. 12 are similar to steps 211-213 of FIG. 10 defined in Freshness-based Content Retrieval, however, in addition, Request Receiving App 203 may also configure re-targeting policies for a given resource. Alternatively, the re-targeting policies may be configured by other entities such as an administrative entity in the network. These policies my include re-targeting rules such as a list of Request Initiating Apps 205 allowed to issue requests to Request Receiving App 203, a list of allowed request types that Request Receiving App 203 will service, a schedule defining the times which Request Receiving App 203 is available and willing to service requests, and a list/mask of request related attributes of interest to Request Receiving App 203.

At step 265, Request Initiating App 205 issues an UPDATE request to Service Layer 204 to update a particular resource associated with a particular Request Receiving App as specified by a targeted address (e.g. a URI). Included in the request may be a complete or partial representation of the resource to be updated. In this example, the UPDATE is used to change the state of a switch supported by Request Receiving App 203 to a value of 'ON'. The message may include one or more of the following: (to=URI, content='ON').

With continued reference to FIG. 12, at step 266, Service Layer 204 processes UPDATE request of step 165. In summary there may be a comparison of current representation of targeted resource against content in request based on retarget policies and determine that they are different therefore retarget request to Request Receiving App 203. In further detail, Service Layer 104 may analyze the re-targeting policies of the resource targeted by Request Initiating App 205's request. Using these policies, Service Layer 204 may perform checks such as whether Request Initiating App 205 is authorized to issue requests to Request Receiving App 203, whether the request is one that is supported by Request Receiving App 203, determination of when to buffer and in turn re-target the request to Request Receiving App 203 based off of a specified schedule or specified condition. Service Layer 204 then compares the current representation of the resource stored in Service Layer 204 (if any) against the representation contained in the UPDATE request. This comparison may take into account a mask defining a subset of resource attributes to compare (or not compare) such that only certain attributes are compared with one another. If the comparison results in no mismatches, then Service Layer 204 may decide to not re-target the UPDATE request to Request Receiving App 203. However, if mismatches are found (as in this example), then Service Layer 204 may decide to re-target the UPDATE request. For cases where the stored state in Service Layer 204 becomes out of sync with the state of Request Receiving App 203 (e.g., light is 'ON' but Service Layer state indicates it is 'OFF'), then it is possible to have mechanisms which override this proposed freshness based filtering functionality. For example, if Service Layer 204 received five consecutive requests to turn light off, Service Layer 204 may forward the request to Request Receiving App 203 even if the stored state indicates the UPDATE request is not fresh.

At step 267 of FIG. 12, Service Layer 204 re-targets the UPDATE request to Request Receiving App 203 to be serviced. Included in this request may be the representation of the resource to be updated included in the original request from Request Initiating App 205. The message of step 267 may include one or more of the following: (to=point of contact, content="Switch ON"). At Step 268, Request Receiving App 203 receives and processes the UPDATE request from Service Layer 204. It may do this by updating its local version of the resource. In this example, the UPDATE is used to change the state of a switch supported by Request Receiving App 203 to a value of 'ON'. At step 269, Request Receiving App 203 responds back to Service Layer 204 indicating that it successfully updated its local version of the resource. At step 270, Service Layer 204 performs an identical update to its local version of the resource (e.g., change the state to a value of 'ON'), which may be responsive to receiving the message of step 269. At step 271, Service Layer 204 sends a message to Request Initiating App 205 indicating that the UPDATE request was successfully processed.

With continued reference to FIG. 12, at step 272, a different Request Initiating App 205 (hereinafter second Request Initiating App 205) issues an UPDATE request which is semantically identical (e.g., contains the same resource representation in the request payload) to the UPDATE from the first Request Initiating App (i.e., associated with request 265). At step 273, Service Layer 204 performs similar processing as described in Step 266. Service Layer 204 detects that the comparison results match (e.g., updated value of 'ON' is identical to current value) and determines not to re-target UPDATE request to Request Receiving App 203. At step 274, Service Layer 204 may update its local metadata to track the fact that an UPDATE request from second Request Initiating App 205 was processed even though it was not re-targeted to Request Receiving App 203. This can be useful for tracking Request Initiating Apps 205 history of requests for purposes such as charging, analytics, and determination of subsequent reactions to requests. At step 275, Service Layer 204 responds back to second Request Initiating App 205 indicating that the UPDATE request was successfully processed.

The following were considerations for some of the methods, systems, and devices discussed herein. A first consideration is that, the current oneM2M architecture seems based on the principles that resources are hosted by CSEs and not AEs. Therefore resources hosted by AEs are not defined by oneM2M and neither are messages or procedures to access AE hosted resources. The type of request defined by oneM2M which can target an AE is a NOTIFY request. An AE is not able to be targeted by a CREATE, RETRIEVE, UPDATE, DELETE, SUBSCRIBE or DISCOVER oneM2M request. Therefore to function as part of a oneM2M system, an AE must register to a CSE and publish or mirror its resources within the CSE such that the CSE may host these resources and make them discoverable and accessible to other AEs.

A second consideration is that oneM2M currently does not support the capability for an AE to specify a point of contact for a given container. In addition, the capability for a CSE to re-target an incoming container request to a corresponding AE to be processed instead of the CSE processing the request is not supported. Also not supported is the capability for a CSE to detect that <contentInstance> resources in a targeted container are too stale to service an incoming request and in turn obtaining a fresh <contentInstance> from an AE to satisfy the request.

A third consideration is that Hosting CSE is limited to servicing a retrieve to <latest> using only the latest <contentInstance> resource which it happens to currently host. If the originator of the request also specifies a createdAfter filter criteria condition having a timestamp later than the creationTime of the latest <contentInstance> this will result in no matches. oneM2M does not currently support mechanisms and procedures to obtain a fresh <contentInstance> resource from an AE in this scenario.

A fourth consideration is that if a specified createdAfter filter criteria condition results in no matches, oneM2M does not currently support mechanisms and procedures to obtain fresh content from an AE which satisfies the specified createdAfter filter criteria. A fifth consideration is that oneM2M does not currently support configuring a pointOfAccess for other resource types which an AE is allowed to create and use (e.g. <container>, <flexContainer>, <mgmtObj>, <mgmtCmd>, etc.). oneM2M further restricts the usage of the pointOfAccess attribute by a CSE to only the case where a CSE is sending a notification to an AE. oneM2M does not allow an AE to configure other address information such as a URI path into the pointOfAccess since in oneM2M does not support AE hosted resources that can be addressed via oneM2M. oneM2M also does not define how the CSE is to use multiple pointOfAccess entries if they are configured by an AE. A sixth consideration is that oneM2M does not currently allow a CSE to initiate or re-target any other types of requests to an AE other than those listed above. For instance, a CSE cannot retrieve or update a resource stored in an application. A seventh consideration is that conventional systems that may deal with application service layers do not define how a forwardingAddress is used to support freshness-based processing of requests. A eighth consideration is that CoRE Mirror Server—IETF draft-vial-core-mirror-server-01, Apr. 10, 2013 does not support the capability to allow a Client to specify a freshness time (e.g., targeted resource can be no older than a certain date or time) in its GET request to a mirrored resource. In addition, among other things, CoRE Mirror Server—IETF draft-vial-core-mirror-server-01, Apr. 10, 2013 does not support the capability to conditionally forward a GET request that it receives for a mirrored resource to a corresponding resource hosted on the SEP for the case where the mirrored resource is stale (e.g., mirror resource representation is older than a specified date or time specified in a Client GET request).

Figure 13:
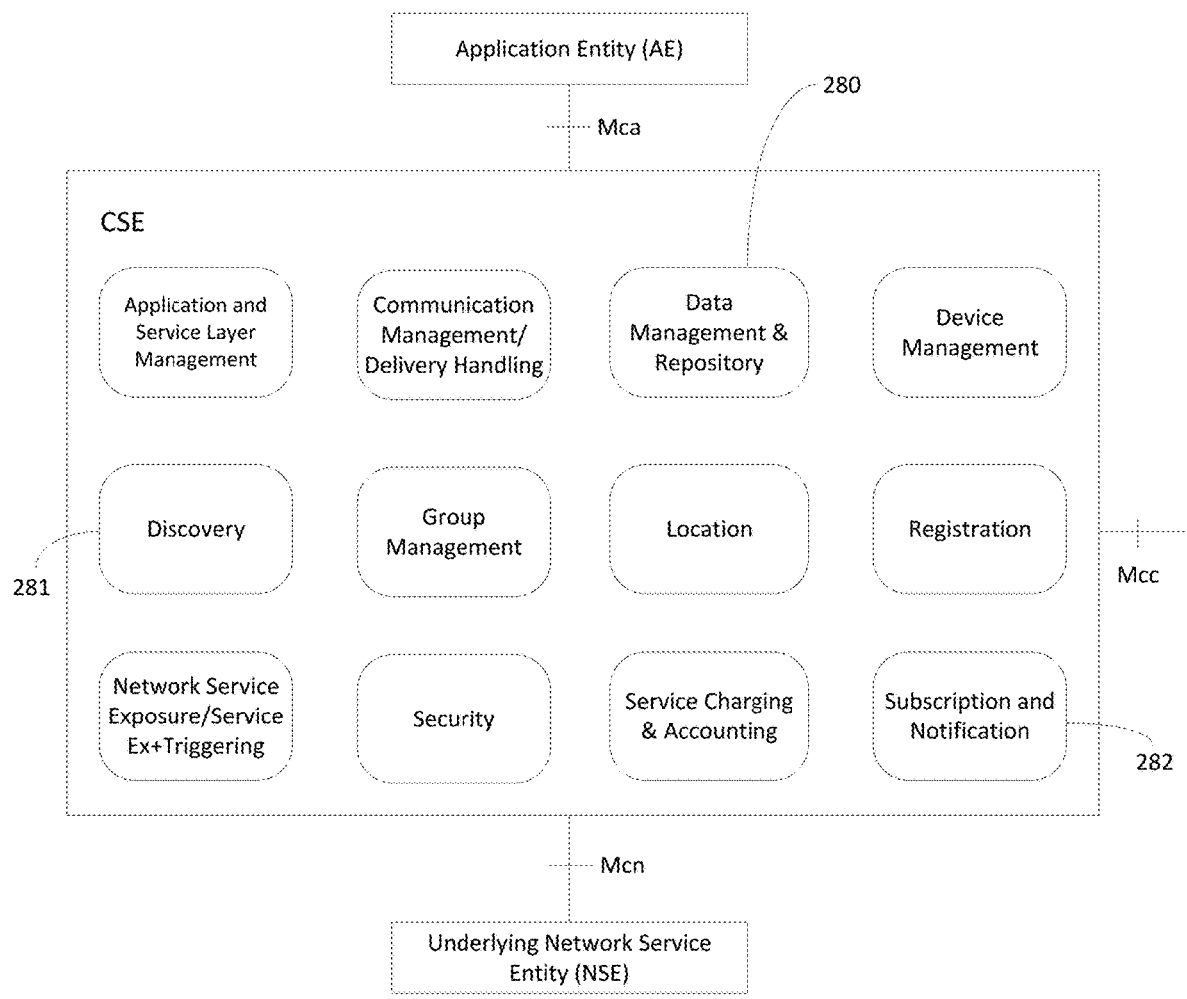
FIG. 13 illustrates an exemplary Architecture of Service Layer Freshness Mechanisms in OneM2M.

Disclosed below are oneM2M examples that may consider and apply the concepts discussed herein. FIG. 13 illustrates an exemplary architecture of service layer freshness mechanisms in OneM2M. The freshness capability may be realized as a feature of the Data Management & Repository CSF, the Discovery CSF, or the Subscription and Notification CSF in a CSE. Freshness capability may be added to Data management & Repository CSF 280, Discovery CSF 281, or Subscription and Notification CSF 282, for example.

To realize the freshness mechanisms and procedures disclosed herein, enhancements to oneM2M resources are defined herein.

Disclosed herein is a pointOfContact common resource attribute to enable a oneM2M resource to be configured with addressing information of an AE. The presence of this attribute for a given resource may be an indication to a Hosting CSE (e.g., service layer 204 of FIG. 10 or CSE 304 of FIG. 14) that the AE affiliated with this resource (e.g. AE that created the resource—Content Sourcing AE 302) supports the capability to service requests sent to it by a CSE. These requests may be requests that a CSE re-targets towards the AE and that are initiated by other entities (e.g., other AEs or CSEs) or that the CSE initiates itself (e.g. to refresh to a stale resource representation). This pointOfContact attribute may be supported by various types of oneM2M defined resources. For example, <container>, <flexContainer>, <mgmtObj>, <mgmtCmd>, <timeSeries>, etc. resource types.

The proposed pointOfContact attribute may support different types of address information of the corresponding AE. In one example, the pointOfContact attribute may be configured with an absolute URI of a resource which the AE hosts (e.g. http://172.30.0.55:3478/temperature). In this case, a CSE may use this pointOfContact as the complete address in which to send requests to the AE. In a second example, the pointOfContact attribute may be configured with a oneM2M defined resourceID of the AE's<AE> resource hosted by the CSE. In this case, a CSE may use this resourceID to access the supported scheme, FQDN or IP address and port of the AE configured within the oneM2M defined pointOfAccess attribute of the <AE> resource. This information may in turn be used to send requests to the AE by the CSE (e.g. http://172.30.0.55:3478). In a third example, the pointOfContact attribute may be configured with a relative URI (e.g., /temperature) of a resource which the AE hosts. In this case, a CSE may use this pointOfContact as a partial address. The CSE may then support forming a complete address by using the FQDN or IP/port configured in the pointOfAccess attribute of the parent <AE> resource affiliated with the resource having a point-of-access attribute. The CSE may use the pointOfContact relative URI (e.g., /temperature) as the path portion of the URI and use the pointOfAccess information as the scheme and host portion (e.g., http://172.30.0.55:3478) to form an absolute URI (e.g., http://172.30.0.55:3478/temperature).

Table 1 provides further details of the disclosed pointOfContact oneM2M common attribute.

TABLE 1 pointOfContact oneM2M common attribute

| New Attributes | Description |
|---|---|
| pointOfContact | This attribute may be configured with contact information that a CSE may use for sending requests to an AE. The presence of this attribute for a given resource may be an indication to the CSE that the AE affiliated with this resource (e.g., AE that created the resource-Content Sourcing AE 302) supports the capability to service requests that a CSE re-targets towards the AE and that are initiated by other entities (e.g., other AEs or CSEs) or that the CSE initiates itself (e.g., to refresh to a stale resource representation). |

This disclosure proposes new oneM2M notification event and content types. These may enable a CSE to support the freshness based content retrieval, content discovery, and request re-targeting functionality disclosed herein. In addition to retrieves, the oneM2M notification content type features may be used to support re-targeting of other types of requests from a CSE to an AE, such as Create, Update, or Delete.

A new type of notification event is defined for the oneM2M subscription eventNotificationCriteria. The new event may be triggered when an attempt to retrieve the latest <contentInstance> of a subscribed-to <container> resource and the <contentInstance> resource is either not present or its creationTime is older than the time specified within the createdAfter filterCriteria of the retrieve request. This is shown in Table 2 herein.

A new type of notification content is defined for oneM2M notifications. The new content type allows an incoming request targeting the subscribed-to-parent resource to be encapsulated in the notification. This is shown in Table 3 below.

These new notification event and content types enable a oneM2M subscription to be used for re-targeting of requests from a CSE to an AE. An AE may use these to configure the CSE to re-target requests that it receives for a given resource to the AE to be serviced. When triggered the new event may result in the CSE generating and sending a notification request to a specified target (e.g., an AE) defined by the notificationURI attribute of the subscription. The content of the notification may contain one or more embedded requests originally targeting the parent resource of the subscription and that the CSE re-targets. Upon receiving the notification, the receiver (e.g., AE) may process the re-targeted request(s) embedded in the content of the notification and response(s) may be returned to the CSE embedded within the content of the notification response. Upon receiving the notification response, the CSE may process the notification response and re-target the response(s) embedded in the content of the notification response back to the originator(s) of the request(s).

In another example, a new type of event is defined for the oneM2M subscription eventNotificationCriteria conditions. This new type of event enables a oneM2M subscription to be used for re-targeting of requests from a CSE to an AE. An AE may use this new type of event to configure the CSE to re-target requests that it receives for a given resource to the AE to be serviced. When triggered eventNotificationCriteria may result in the CSE generating and sending a notification request to a specified target (e.g., an AE) defined by the notificationURI attribute of the subscription. The content of the notification may contain one or more embedded requests originally targeting the parent resource of the subscription and that the CSE re-targets. Upon receiving the notification, the receiver (e.g. AE) may process the re-targeted request(s) embedded in the content of the notification and response(s) may be returned to the CSE embedded within the content of the notification response. Upon receiving the notification response, the CSE may process the notification response and re-target the response(s) embedded in the content of the notification response back to the originator(s) of the request(s).

TABLE 2

Type of Notification Event

| Condition Tag | Description |
|---|---|
| eventType | In addition to the existing event types already defined by oneM2M, this event is defined as described below. Generate an event (e.g. staleLatest) when a retrieve request is attempted to retrieve the latest <contentInstance> of a subscribed-to <container> resource and the <contentInstance> resource is not present or its creationTime is older than the time specified within the createdAfter filterCriteria of the retrieve request. |

TABLE 3

Type of Notification Content

| Condition Tag | Description |
|---|---|
| notificationContentType | In addition to the existing notification content types already supported by a oneM2M subscription, notification content type "Request" is defined as described below. "Request"-For this content type, one or more requests targeting the subscribed-to-parent resource shall be containedwithin the content of the notification request. |

Figure 19:
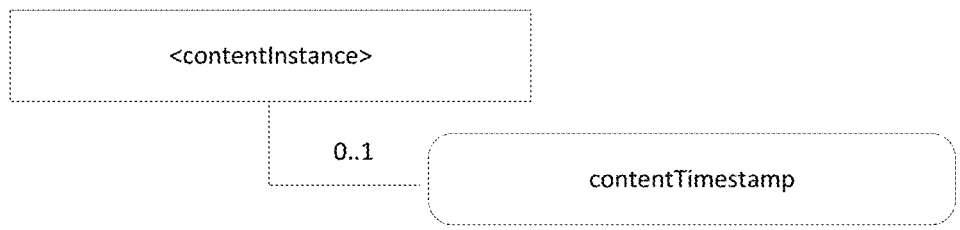
FIG. 19 illustrates an exemplary oneM2M contentTimestamp Attribute.

Disclosed herein is a new oneM2M attribute, contentTimestamp, for the <contentInstance> resource type as illustrated in FIG. 19 and also see Table 4. This attribute enables an AE to configure an AE defined timestamp for the content it publishes to the CSE. This allows an AE to publish the time that the content was created by the AE which may differ from the time when the content was actually published by the AE and created on the CSE. This may be significant for use cases where an AE may buffer content and publish it to a CSE sometime later. Allowing an AE to publish this time to the CSE provides other AEs requesting access to this content with additional information regarding when the content was actually generated or collected by the originating AE versus when it was published to the CSE.

TABLE 4 contentTimestamp attribute

| New Attributes | Description |
|---|---|
| contentTimestamp | Contains an AE defined timestamp value that may be used to capture the time when the content originated on the AE. |

Disclosed herein are enhancements to the oneM2M <accessControlPolicy> resource to add support for a new type of RETARGET operation that may be supported by the oneM2M defined accessControlOperations parameter of the privileges attribute of the <accessControlPolicy> resource. Table 5 captures the new RETARGET operation. This RETARGET operation may be used to define whether a request from a particular originator has privileges to be re-targeted by the CSE or not. If the RETARGET operation is defined within the accessControlOperations list, then re-targeting is enabled, otherwise it is disabled. If enabled, a CSE may re-target the request to a specified entity such as an AE. As discussed herein, there are several methods for specifying an entity to receive a re-targeted request. For example, the pointOfContact attribute is one and the notificationURI is another.

This disclosure discussed adding contentRequest, contentReference, freshnessTime, contentPriority, and contentSchedule elements to the m2m:notification data type and corresponding notification schema file to support sending a notification to an AE to have it provide fresh content to a CSE as defined by the freshness based procedure. The requested content may be returned to the requesting CSE via the notification response or alternatively an AE may follow up with a separate request to update or create the content on the requesting CSE. It is contemplated herein that a contentSchedule may include an expected period that freshness of content is expected. For example, the contentSchedule may be a periodic schedule (e.g., appearing or occurring at intervals of 5 minutes) or a non-periodic schedule such as particular times and dates (e.g., May $5^{th}$ at 13:00, June $7^{th}$ at 10:00, etc. . . . ). CSE may determine, via a pattern of requests received (e.g., analyzing multiple freshness periods in the requests from one or more content requesting applications to the particular CSE or similarly situated CSEs), that it will need to receive a fresh reading from the content source application based on a schedule (e.g., threshold period). This may reduce the number of requests from CSE, because the content source application will proactively send content updates based on the s. The schedule may result in increasing or decreasing the frequency of updates from the content source (e.g., content sourcing 202). Although content source is discussed these principles may also be applied to situations involving request receiving applications (e.g., FIG. 12 that may involve actuators).

Also discussed herein is the addition of createRequest, retrieveRequest, updateRequest, deleteRequest, discoverRe-

TABLE 5 accessControlOperations attribute

| Name | Description | |
|---|---|---|
| RETRIEVE | Privilege to retrieve the content of an addressed resource | oneM2M accessControlOperations |
| CREATE | Privilege to create a child resource | |
| UPDATE | Privilege to update the content of an addressed resource | |
| DELETE | Privilege to delete an addressed resource | |
| DISCOVER | Privilege to discover the resource | |
| NOTIFY | Privilege to receive a notification | |
| RETARGET | Privilege to retarget a request | New accessControlOperations type Defined by this disclosure |

To help realize the proposed freshness mechanisms disclosed herein, the following enhancements to oneM2M request and response messages are defined. The structure of a oneM2M notification request may defined by the m2m:notification data type and corresponding notification schema file.

quest and subscribeRequest elements to enable a CSE to initiate or re-target create, retrieve, update, delete, subscribe, and discover requests to an AE via a oneM2M notification request such that the AE may service these requests and return a response back to the CSE via a oneM2M notification response.

TABLE 6 oneM2M Notification Request Message Enhancements

| Element Path | Element Data Type | Note |
|---|---|---|
| contentRequest | xs:boolean | Indicates that notification is a request for fresh content to be updated/created on a CSE. |

TABLE 6-continued oneM2M Notification Request Message Enhancements

| Element Path | Element Data Type | Note |
| --- | --- | --- |
| contentReference | xs:anyURI | Specifies a requested URI for fresh content to be updated/created on a CSE. |
| contentFreshnessTime | m2m:timestamp | Indicates fresh content being requested shall be no older than the specified time and date. |
| contentPriority | xs:positiveInteger | A priority level of when the requested content is needed (e.g., 1 = LOW, 2 = MED, 3 = HIGH) |
| contentSchedule | m2m:scheduleEntries | A schedule by which requested content is needed by the CSE |
| createRequest | xs:boolean | Indicates that notification representation contains a create request |
| retrieveRequest | xs:boolean | Indicates that notification representation contains a retrieve request |
| updateRequest | xs:boolean | Indicates that notification representation contains a update request |
| deleteRequest | xs:boolean | Indicates that notification representation contains a delete request |
| discoverRequest | xs:boolean | Indicates that notification representation contains a discover request |
| subscriptionRequest | xs:boolean | Indicates that notification representation contains a subscription request |
| requestReference | xs:any URI | Specifies a URI of a resource hosted by the receiver of the notification and which is being targeted by a request contained within representation of the notification. | oneM2M currently defines a device triggering feature in its Release 1 specifications (oneM2M-TS-0001 oneM2M Functional Architecture-V2.6.0, which is incorporated by reference in its entirety). However, oneM2M has yet to define the message format of a device trigger request message that is sent from a CSE to a device triggering function supported by an underlying network function such as 3GPP.

Elements similar to those defined in Table 6 should also be considered as new device trigger request elements as well. In doing so, oneM2M device trigger requests may be used as another alternative to using retrieve or notify requests for the freshness-based content retrieval and discovery procedures defined in this disclosure. This may particularly be applicable to the use case in which a freshness-based content retrieval or discovery request is preferred (or needs) to be initiated to a Content Sourcing AE that is hosted on device that is not currently reachable to the CSE. In this case, the CSE may initiate a device trigger request to the Content Sourcing AE and at the same time embed freshness-based content retrieval elements in the trigger request. Similarly, the same functionality may be used to forward a request to a Request Receiving AE.

Figure 14:
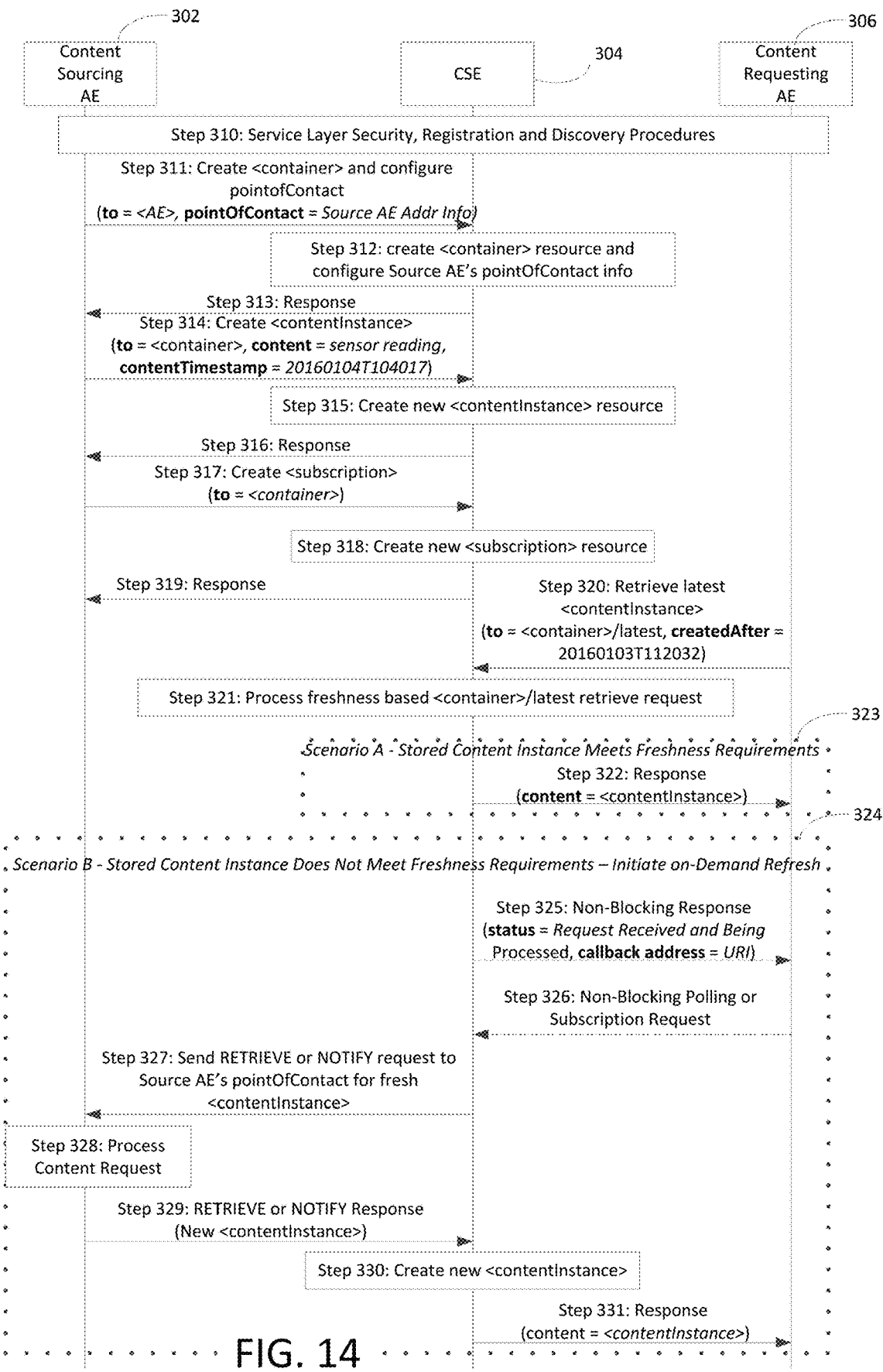
FIG. 14 illustrates an exemplary oneM2M Freshness-based Content Retrieval Message Flow.

To realize the disclosed freshness mechanisms, the following enhancements to oneM2M procedures are defined with reference to FIG. 14.

A oneM2M CSE (e.g., CSE 304) may be enhanced to support the capability to allow an AE to optionally specify a pointOfContact address for a given resource. For example, an AE may configure the pointOfContact attribute of a <container> resource. By configuring the pointOfContact attribute, an AE may indicate to CSE 304 that it supports the capability to receive and service requests associated with the given resource. For example, an AE may receive a request to create a fresh <contentInstance> for a given <container> resource.

CSE 304 may support different methods to determine when to send a request to Content Sourcing AE 302 to service versus when CSE 304 services the request itself using a locally stored representation of the targeted resource. One such method may involve a freshness time specified within a retrieve request using the oneM2M defined createdAfter filter parameter. Using this request parameter, a requester may specify a freshness time stamp in the request. CSE 304 may compare the creationTime (and/or the proposed contentTimestamp attribute) of one more locally stored representations of a targeted resource against this createdAfter filter parameter. If the creationTime is found to be newer (more recent or timely) than the createdAfter timestamp, than CSE 304 may service the request itself without involving Content Sourcing AE 302. However, if the creationTime is older, CSE 304 may initiate a request to the corresponding Content Sourcing AE 202's pointOfContact in an attempt to obtain a fresh version of the resource representation that services the retrieve request and to satisfy its specified freshness preference or requirement.

FIG. 14 illustrates an exemplary oneM2M freshness-based content retrieval message flow. Although this procedure is shown using oneM2M <container> and <contentInstance> resource types, similar procedures may also be used for other oneM2M resource types such as <flexContainers>, mgmtObj, mgmtCmd, etc.

At step 310, Content Sourcing AE 302 and Content Requesting AE 306 authenticate and then register with CSE 304. Content Requesting AE 306 then discovers Content Sourcing AE 302. At steps 311-313 Content Sourcing AE 302 creates a <container> resource and configures its pointOfContact information (e.g. a URI). At step 311 Content Sourcing AE 302 sends a create <container> and configure pointOfContact message, which may have one or more of the following: (to=<AE>, pointOfContact=Source AE Addr Info). At step 312, CSE 204 creates <container> resource and configures Source AE's pointOfContact info based on step 311. At step 313, CSE 304 may send a response message that may include a general acknowledgement of the request or completion of the request.

At steps 314-316 of FIG. 14, Content Sourcing AE 302 creates one or more <contentInstance> child resources within the <container> resource. Each <contentInstance> is created and stored by CSE 304 (step 315). Content Sourcing AE 302 may also provide a contentTimestamp of when the content instance (e.g., sensor reading) was generated or captured by Content Sourcing AE 302. In addition, CSE 304 may assign a creationTime to a <contentInstance> indicating the time the content instance was created in CSE 304.

With continued reference to FIG. 14, at steps 317-319, Content Sourcing AE 302 may subscribe to the <container> to receive a notification from CSE 304 whenever a retrieve request is attempted to retrieve the latest <contentInstance> of a subscribed-to <container> resource and the <contentInstance> resource is either not present or its creationTime is older than the time specified within the createdAfter filterCriteria of the retrieve request. To do this, Content Sourcing AE 302 may configure subscription's notification eventType and content types per the new formats defined herein. At step 317, Content Sourcing AE sends a message to create a subscription, which may have the following information: (to=<container>). At step 318, CSE 304 (responsive to step 317) creates a <subscription> resource. At step 319, a response may be sent.

At step 320 of FIG. 14, Content Requesting AE 306 issues a request to CSE 304 to retrieve the latest <contentInstance> resource stored in a targeted <container> of Content Sourcing AE 302. Included in the request is a specified createdAfter parameter that may include time and date information. Content Requesting AE 306 may use this parameter to specify that it requires content no older than the specified time and date. At step 321, CSE 304 compares the specified time and date information within the createdAfter parameter of the request against the creationTime (or contentTimestamp) of the latest <contentInstance> (if present) stored within the <container> resource. From this comparison, CSE 304 determines if a <contentInstance> is available and if so if it meets the freshness requirements of Content Requesting AE 306. At step 322, within block 323 of FIG., if CSE 304 finds a <contentInstance> that satisfies the specified createdAfter requirement, then it may return a response to Content Requesting AE 306 containing the <contentInstance>. In this case, CSE 304 does not need to initiate a request to Content Sourcing AE 302 to obtain a fresh <contentInstance>.

With continued reference to FIG. 14, proceed to block 324 if stored content instance does not meet freshness preference or requirement. At step 325, if CSE 304 does not find a <contentInstance> that satisfies the specified createdAfter requirement (i.e., threshold period), CSE 304 may return an acknowledgement (i.e., non-blocking response) to Content Requesting AE 306 such that Content Requesting AE 306 is not required to block and wait while CSE 304 attempts to obtain a fresh <contentInstance> from Content Sourcing AE 302. This acknowledgement (i.e., non-blocking response) of step 325 may include a status to indicate that the request was received and is still being processed since CSE 304 did not have a locally hosted <contentInstance> that met Content Requesting AE 306's freshness requirement. The acknowledgement of step 325 may also include a CSE callback address (e.g. URI) that may be used by Content Requesting AE 306 to retrieve or subscribe to receive a fresh <contentInstance> when it becomes available. For example, Content Requesting AE 306 may periodically poll or subscribe (see step 326) to this address and receive a fresh <contentInstance> when CSE 304 is either able to obtain a fresh <contentInstance> from Content Sourcing AE 302 or an error condition if CSE 304 is unsuccessful in obtaining a fresh <contentInstance> from Content Sourcing AE 302. Alternatively, CSE 304 may choose to process the request in a blocking manner in which case it would not return an acknowledgement to Content Requesting AE 306 in this step 325. Instead it would hold off responding to Content Requesting AE 306 until step 331 in this procedure as displayed in FIG. 14.

At step 327 of FIG. 14, CSE 304 initiates a request to Content Sourcing AE 302 requesting a fresh <contentInstance>. This request may be delivered to Content Sourcing AE 302 using one of several different types of proposed requests. With reference to a first proposed request, CSE 304 may initiate a retrieve request targeting the pointOfContact specified by Content Sourcing AE 302 in Step 311. This request may also contain a createdAfter parameter which may be configured with the same timestamp as the one in the original request from Content Requesting AE 306. Alternatively, CSE 304 may initiate a notification request to Content Sourcing AE 302, if the subscription request described in step 317 was performed by Content Sourcing AE 302. This notification may contain elements such as those disclosed herein, such as discussion associated with Table 6.

At step 328 of FIG. 14, upon receiving the request of step 327 from CSE 304, Content Sourcing AE 302 may process and detect the type of request (e.g., retrieve or notify). If the request of step 327 is a retrieve, Content Sourcing AE 302 may analyze the specified address and a createdAfter parameter if present in the request to determine which content is being requested and in turn prepare a <contentInstance> to return to CSE 304 in the retrieve response. If the request is a notification, Content Sourcing AE 302 may detect it is a request for content by checking if the contentRequest element is present and configured to TRUE. If Content Sourcing AE 302 supports more than one type of content, it may check the contentReference element to detect which type of content is being requested by CSE 304. It may then check the contentPriority or contentSchedule elements to determine when it must provide CSE 304 with a fresh <contentInstance>. Content Sourcing AE 302 may also check the contentFreshness parameter to see if there is a required freshness date or time of the content specified. If one is specified, Content Sourcing AE 302 may make sure that any <contentInstance> that it provides was not generated before this date and time.

At step 329 of FIG. 14, Content Sourcing AE 302 may update CSE 304 with a fresh content instance in one of several methods. If CSE 304 issues an explicit retrieve request to Content Sourcing AE 302 requesting a fresh <contentInstance>, then Content Sourcing AE 302 may include a fresh <contentInstance> in the retrieve response. If CSE 304 issues a notification to Content Sourcing AE 302 indicating that a fresh <contentInstance> is needed, then Content Sourcing AE 302 may include a fresh <contentInstance> in the notification response or alternatively Content Sourcing AE 302 may follow-up with a separate request (e.g., Create request) to create a fresh <contentInstance> in the <container> resource specified by the contentReference element in the notification request. At step 330, if a fresh <contentInstance> is successfully returned or created, then CSE 304 stores a local version of the fresh <contentInstance> such that it may be leveraged to service future requests or be used for purposes such as charging and analytics, among other things. CSE 304 may also optionally assign a corresponding timestamp to keep track of when the <contentInstance> was created in CSE 304. At step 331, if a fresh <contentInstance> is successfully published to CSE 304, then it is returned to Content Requesting AE 306 otherwise an error is returned instead.

Figure 15:
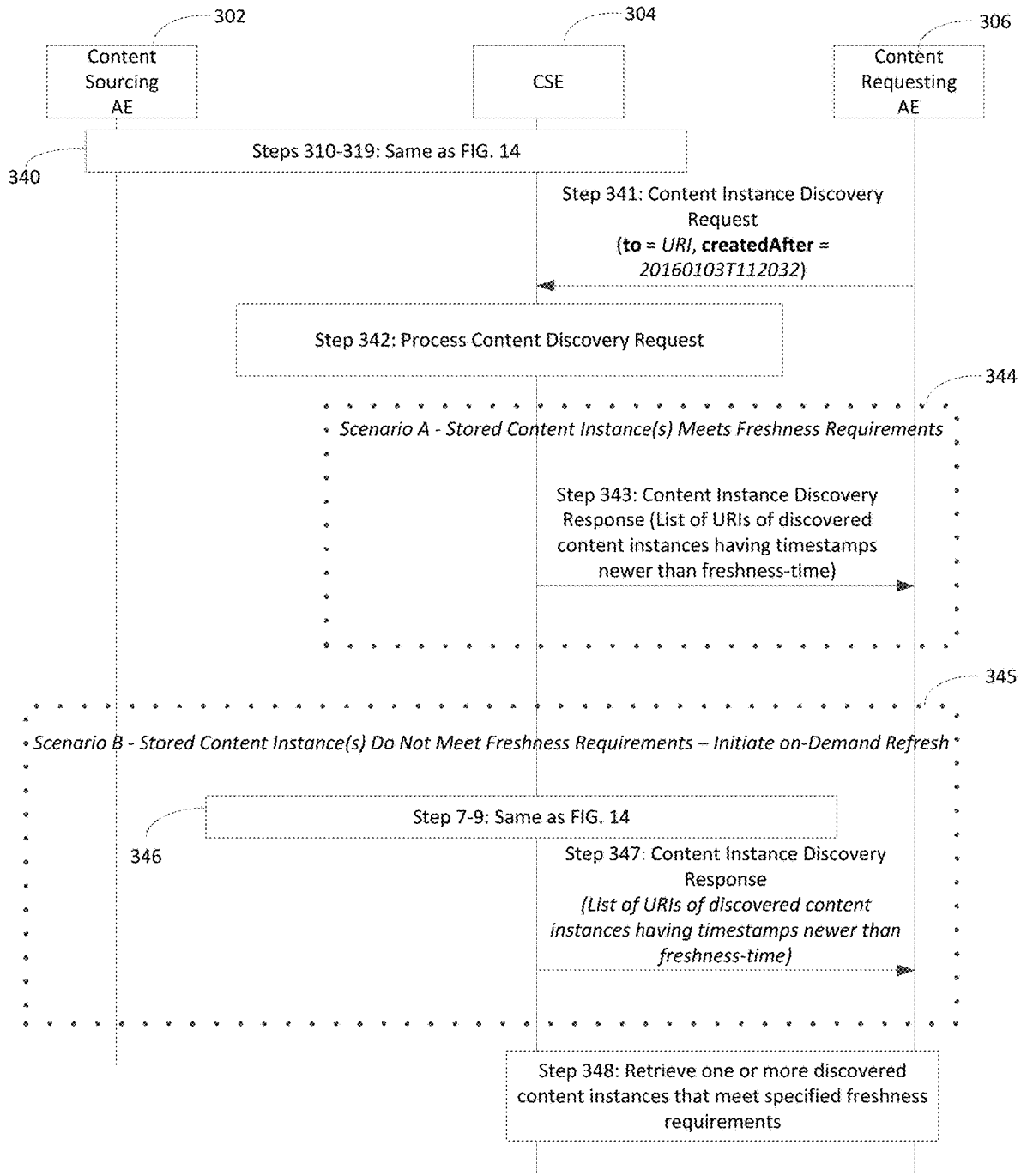
FIG. 15 illustrates an exemplary oneM2M Freshness-based Resource Discovery Message Flow.

The following with reference to FIG. 15 enhances existing oneM2M defined resource discovery procedures by adding the freshness-based content discovery aspects disclosed. Mechanisms allow CSE 304 to detect when a <contentInstance> resource of interest to a Content Requesting AE 306 is stale or not, and contacts the corresponding Content Sourcing AE 302 to have it provide a fresh <contentInstance> which CSE 304 may then reference in the discovery response FIG. 15 illustrates an exemplary oneM2M freshness-based resource discovery message flow. Although this procedure is shown using oneM2M <container> and <contentInstance> resource types, similar procedures may also be used for other oneM2M resource types such as <flexContainers>, mgmtObj, mgmtCmd, etc.

Block 340 of FIG. 15 has the same steps 310-319 as shown and discussed regarding FIG. 14. At step 341 of FIG. 15, Content Requesting AE 306 requests CSE 304 to discover <contentInstance> resource(s) associated with a particular <container> resource. Included in the request may be a specified createdAfter parameter configured with time and date information that Content Requesting AE 306 uses to specify that it wishes to discover content no older than the specified time and date. In addition, the request may include other discovery filter criteria as well (e.g., type of content). At step 342, CSE 304 compares the specified time and date information within the createdAfter parameter of the content discovery request against the timestamp of each applicable <contentInstance> resources hosted by CSE 304 within the targeted <container> resource(s). From this comparison, CSE 304 determines if any of the applicable <contentInstance> resources have a creationTime or contentTimestamp newer than the specified createdAfter parameter. If none are found, CSE 304 may generate an event to signal that a fresh <contentInstance> is required from a corresponding Content Sourcing AE such that CSE 304 may include a reference (e.g., URI) to this content in the discovery response it sends to Content Requesting AE 306 and that CSE 304 has the content ready and available when Content Requesting AE 306 sends a subsequent request to access the <contentInstance>. This event in turn may be used by CSE 304 as a trigger to try and obtain a fresh <contentInstance> from Content Sourcing AE 302 as defined by the proposed procedures outlined in steps 325-330 in the oneM2M Freshness-based Content Retrieval procedure specified with regard to FIG. 14. The generation of the trigger may be qualified based on whether or not an applicable pointOfContact attribute has been configured in the targeted <container> resource or not. If no pointOfContact has been configured, the trigger may be suppressed.

With continued reference to FIG. 15, at step 343 of block 344, if CSE 304 finds a <contentInstance> that satisfies the createdAfter timestamp, then it may return a response to Content Requesting AE 306 that includes a reference (e.g., URI) to this content in the discovery response. In this case, CSE 304 does not need to initiate refreshing its locally stored <contentInstance> resource(s).

Block 345 occurs when stored content instance(s) do not meet freshness preferences or requirements, which may initiate on-demand refresh. Block 346 contains the same steps as steps 325-330 of FIG. 14. At step 347, if a fresh <contentInstance> is successfully published to CSE 304 from Content Sourcing AE 302, then a reference (e.g., URI) to this content is returned in the discovery response otherwise an error is returned instead. At step 348, Content Requesting AE 306 processes the discovery response and subsequently retrieves one or more of the discovered content instances (based on the specified references in the response) that meet its freshness preferences or requirements.

Figure 16:
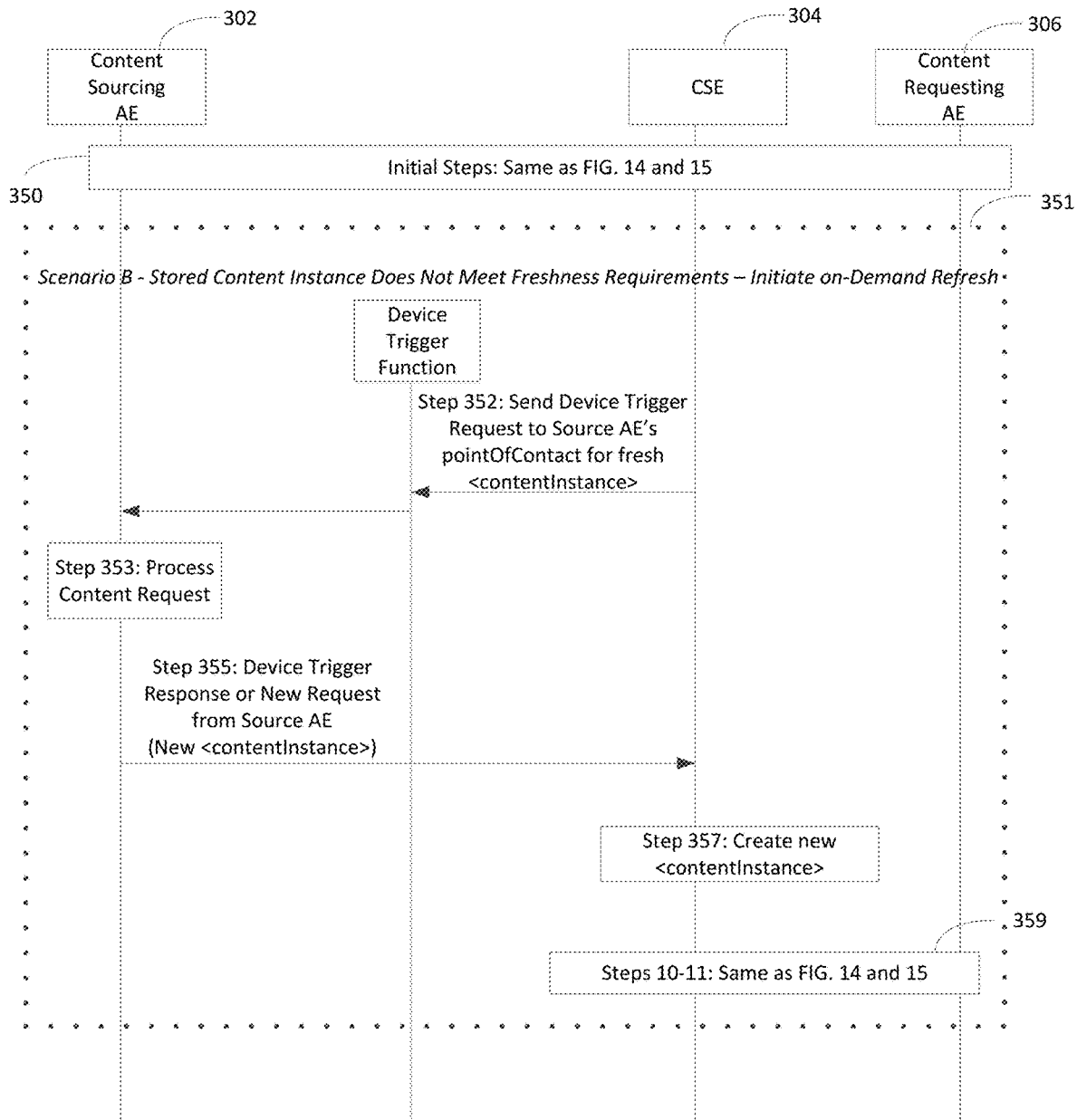
FIG. 16 illustrates an exemplary oneM2M Freshness-based Device Trigger Message Flow.

The following procedures, with reference to FIG. 16, enhance the existing oneM2M defined device triggering procedure by adding the freshness-based content retrieval aspects disclosed herein. Mechanisms allow CSE to detect when a <contentInstance> resource of interest to a Content Requesting AE is stale or not, and in turn contact the corresponding Content Sourcing AE 302 (via a device trigger) to have it provide a fresh <contentInstance> such that CSE 304 may complete its processing of the retrieval request. Although this procedure is shown using oneM2M <container> and <contentInstance> resource types, similar procedures may also be used for other oneM2M resource types such as <flexContainers>, mgmtObj, mgmtCmd, etc. Block 350 of FIG. 17 includes steps that are similar to the non-scenario B block 351 steps of FIG. 14 and FIG. 15 (e.g., steps 310-322 of FIG. 14).

With continued reference to FIG. 16, at step 352, CSE 304 initiates a Device Trigger request to Content Sourcing AE 302 requesting a fresh <contentInstance>. Device Trigger request of step 352 may be sent from CSE 304 to Device Trigger Function 303 supported by an underlying network (e.g., 3GPP MTC-IWF). The Device Trigger request message of step 352 may contain elements as disclosed herein regarding device triggering. At step 353, upon receiving the Device Trigger request, Content Sourcing AE 302 may process it. Content Sourcing AE 302 may detect it is a request for content by checking if the contentRequest element is present and configured to TRUE. If Content Sourcing AE 302 supports more than one type of content, it may check the contentReference element to detect which type of content is being requested by CSE 304. It may then check the contentPriority or contentSchedule elements to determine when it must provide CSE 304 with a fresh <contentInstance>. It may also check the content Freshness parameter to see if there is a required freshness date or time of the content specified. If one is specified, Content Sourcing AE 302 may make sure that any <contentInstance> that it provides was not generated before this date and time.

At step 355, Content Sourcing AE 302 may update CSE 304 with a fresh content instance in one of several methods. Content Sourcing AE 302 may include a fresh <contentInstance> in the Device Trigger response or alternatively Content Sourcing AE 302 may follow-up with a separate request to CSE 304 (e.g., Create request) to create a fresh <contentInstance> in the <container> resource specified by the contentReference element in the trigger request. At step 357, if a fresh <contentInstance> is successfully returned or created, then CSE 304 stores a local version of the fresh <contentInstance> such that it may be leveraged to service future requests. Block 259 of FIG. 16 has the same steps as defined in Freshness-based Content Retrieval and Discovery procedures specified in FIG. 14, steps 331 or FIG. 15 steps 247 and 248.

Figure 17:
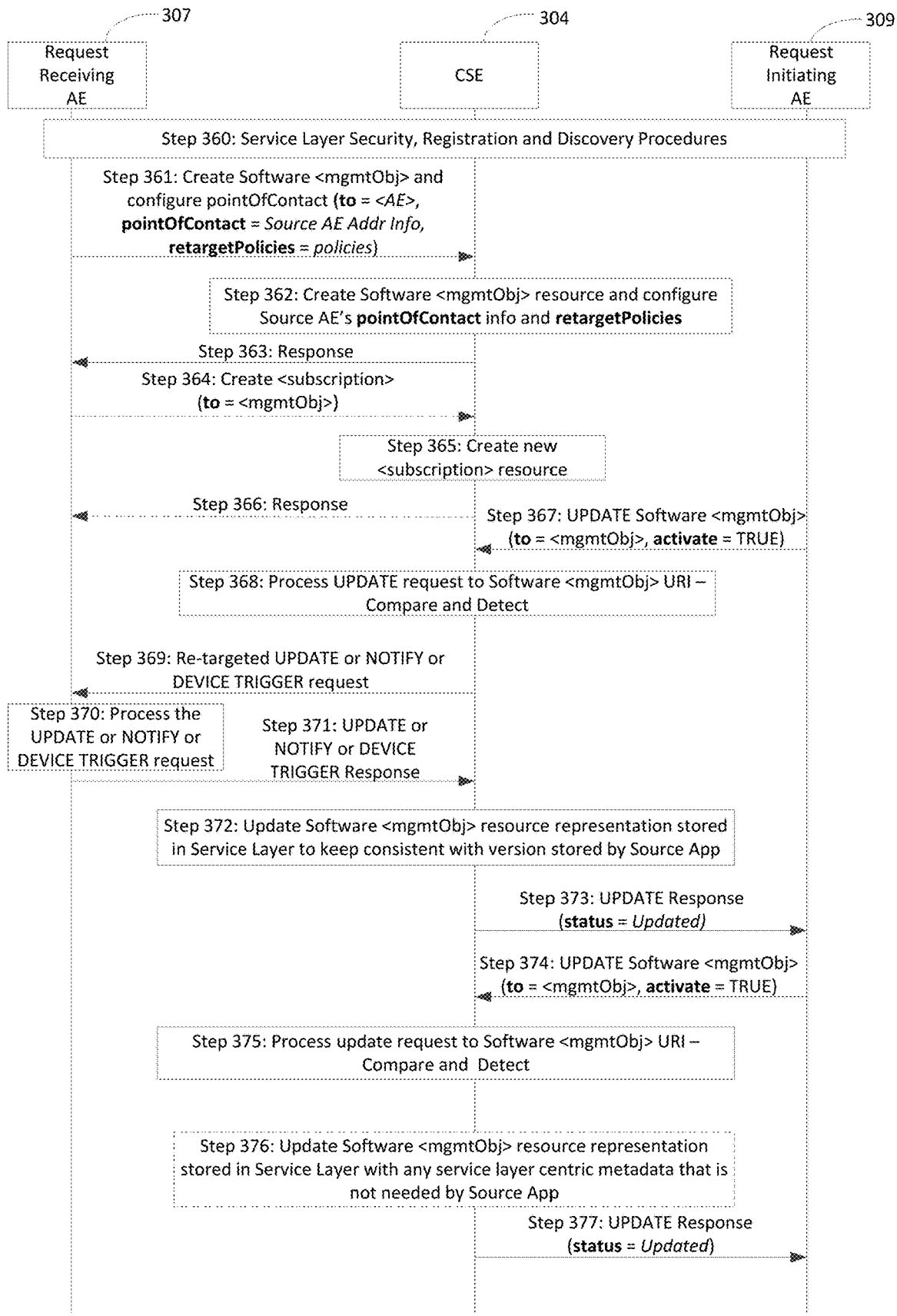
FIG. 17 illustrates an exemplary oneM2M Freshness-based Re-Targeting Message Flow.

The following procedure with reference to FIG. 17 enhances the existing oneM2M defined resource procedures based on the re-targeting functionality, among other things, disclosed herein. Mechanisms allow CSE 304 to detect when a targeted resource is updated and re-target the request to a corresponding Request Receiving AE to have it update its local version. Although this procedure is shown using oneM2M <mgmtObj> resource type, similar procedures may also be used for other oneM2M resource types such as <container>, <flexContainers>, <mgmtCmd>, etc.

With continued reference to FIG. 17, at step 360, Request Receiving AE 307 and Request Initiating AE 309 authenticate and then register with CSE 304. Request Initiating AE 309 then discovers Request Receiving AE 307. Steps 361-363, Request Receiving AE 307 creates a Software <mgmtObj> resource and configures its pointOfContact information (e.g., a URI) and its accessControlPolicies. These policies may include re-targeting rules such as a list of Request Initiating AEs 209 allowed to issue requests to Request Receiving AE 307, a list of allowed request types allowed to be re-targeted, a schedule defining the times which requests may be re-targeted. At steps 364-366, Request Receiving AE 307 may subscribe to the <mgmtObj> to receive a notification from CSE 304 whenever an UPDATE request is attempted and the UPDATE changes the state of one of the <mgmtObj> resource attributes that Request Receiving AE 307 is interested in (as specified in the re-targetPolicies). To do this, Request Receiving AE 307 may configure subscription's notification eventType and content types per the newly proposed formats defined herein. At step 367, Request Initiating AE issues a request to CSE 304 to UPDATE the activate attribute to a value of 'TRUE' in the <mgmtObj> resource.

At step 368 of FIG. 17, CSE 304 analyzes the re-targeting policies of the resource targeted by Request Initiating AE 309's request. Using these policies, CSE 304 may perform checks such as whether Request Initiating AE 309 is authorized to issue requests to Request Receiving AE 307, whether the request type is one that is authorized to be re-targeted, and determination of when to re-target the request to Request Receiving AE 307 based off of a specified schedule, among other things. CSE 304 then compares the current representation of the <mgmtObj> resource stored in the service layer against the representation contained in the UPDATE request. This comparison may take into account a mask defining a subset of resource attributes to compare (or not compare) such that only certain attributes are compared with one another. The comparison results in a mismatch due to the change in state of the activate attribute. Hence CSE 304 decides it needs to re-target the UPDATE request to Request Receiving AE 307.

At step 369 of FIG. 17, CSE 304 re-targets the UPDATE request to Request Receiving AE 307 to be serviced. This request may be delivered to Request Receiving AE 307 using one of several different types of proposed requests. CSE 304 may initiate a UPDATE request targeting the pointOfContact specified by Request Receiving AE 307 in step 361. Secondly, the Service Layer (CSE 204) may initiate a notification request to Request Receiving AE 307 if the subscription request described in step 364 was performed by Request Receiving AE 307. This notification may contain elements as disclosed herein. Thirdly, CSE 304 may initiate a Device Trigger request to Request Receiving AE 307, if Request Receiving AE 307 is not reachable. This Device Trigger request may contain elements such as those disclosed herein. At step 370, upon receiving the request from CSE 304, Request Receiving AE 307 may process and detect the type of request (e.g. UPDATE or NOTIFY or DEVICE TRIGGER). If the request is an UPDATE, for example, Request Receiving AE 307 may analyze the specified address and perform the update to the AE's local <mgmtObj> and return a response to CSE 304 in the UPDATE response. If the request is a NOTIFY or DEVICE TRIGGER, Request Receiving AE 307 may detect it is a request for UPDATE by checking if the updateRequest element is present and configured to TRUE. If Request Receiving AE 307 supports more than one type of content, it may check the requestReference element to detect what update is being requested by CSE 304.

At step 371 of FIG. 17, Request Receiving AE 307 may respond to CSE 304 in one of several proposed methods. If CSE 304 issues an explicit UPDATE request to Request Receiving AE 307, then Request Receiving AE 307 may respond with an UPDATE response. If CSE 304 issues a NOTIFY or DEVICE TRIGGER to Request Receiving AE 307, then Request Receiving AE 307 may respond back in the notification or device trigger responses, respectively. At step 372, upon receiving the response from Request Receiving AE 307, CSE 304 performs an identical update to its local version of the resource (e.g., change the state to a value of 'ON'). At step 373, CSE 304 responds back to Request Initiating AE 309 indicating that the UPDATE request was successfully processed. At step 374, Request Initiating AE 309 sends a second UPDATE request which is identical to the first UPDATE. At step 375, CSE performs similar processing as described in step 368. CSE detects that comparison results in a match (updated value of 'ON' is identical to current value) and determines not to re-target UPDATE request to Request Receiving AE 307. At step 376, CSE 304 updates its local metadata to track the fact that an UPDATE request from Request Initiating AE 309 was processed even though it was not re-targeted to Request Receiving AE 307. This may be useful for tracking Request Initiating AE 309 history of requests for purposes such as charging and analytics. At step 377, CSE 304 responds back to Request Initiating AE 309 indicating that the UPDATE request was successfully processed.

Figure 18:
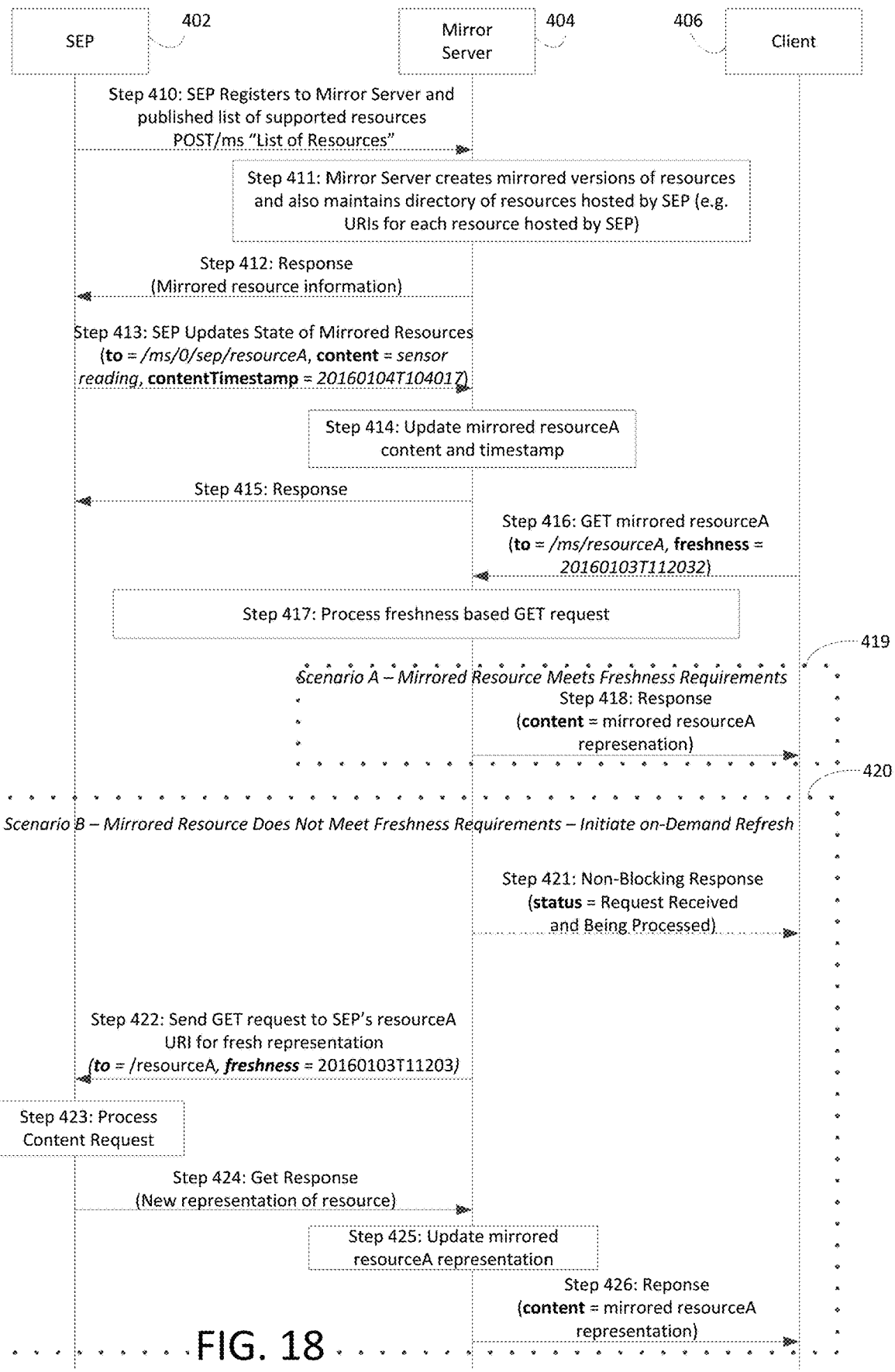
FIG. 18 illustrates an exemplary CoRE Mirror Server Freshness-based Content Retrieval Message Flow.

FIG. 18 illustrates an exemplary CoRE mirror server freshness-based content retrieval message flow, in which freshness-based content discovery, content retrieval, and request re-targeting ideas are integrated into a CoRE Mirror Server (i.e., Mirror Server 404). Mirror Server 404 may support freshness-based content discovery and retrieval requests in which Mirror Server 404 may service these requests using mirrored resource representations as long as these representations meet the freshness requirements specified in a GET request. Otherwise, Mirror Server 404 may initiate a GET request to a corresponding device to obtain a fresh representation of the targeted resource which it may then use to service the original request as illustrated in the procedure captured in FIG. 18 below. One proposed protocol level enhancements for this embodiment includes the definition of a new freshness parameter (as shown in step 416) that may be configured within a GET request to specify a required freshness (e.g., a date and time value) of a resource representation it is targeting. The freshness parameter may be realized as a query string parameter that may be included in the URI query string. Alternatively, the freshness parameter may be realized as a new CoAP header option (or alternatively HTTP if it is being used by Mirror Server 404).

With continued reference to FIG. 18, at step 410, SEP 402 registers with Mirror Server 404 and provides a list of supported resources which SEP 402 locally hosts and would like Mirror Server 404 to mirror on its behalf. At step 411, Mirror Server 404 creates mirrored versions of the resources of SEP 402 and also maintains a directory of information (e.g., URI of each resource) hosted locally by SEP 402. At step 412, Mirror Server 404 responds to SEP 402 and includes list of mirrored resources. At steps 413-415, SEP 402 updates one or more mirrored resources on Mirror Server 404. Each update is stored by Mirror Server 404. SEP 402 may also provide a contentTimestamp of when the content (e.g. sensor reading) was generated or captured by SEP 402. Mirror Server 404 may also assign a creationTime to the mirrored resource indicating the time the content instance was updated at Mirror Server 404. At step 416, Client 406 issues a request to Mirror Server 404 to retrieve the mirrored resource hosted by Mirror Server 404. Included in the request may be a specified freshness parameter configured with time and date information. Client 406 may this parameter to specify that it requires content no older than the specified time and date.

At step 417 of FIG. 18, Mirror Server 404 compares the specified time and date information within the freshness parameter of the request against the creationTime (or contentTimestamp) of the mirrored resourceA (if present) hosted by Mirror Server 404. From this comparison, Mirror Server 404 determines if a resourceA is available and if so if it meets the freshness requirements of Client 406. At step 418 within block 419, if Mirror Server 404 finds a mirrored resourceA that satisfies the specified freshness requirement, then it may return a response to Client 406 containing the representation of resourceA. In this case, Mirror Server 404 does not need to initiate a request to SEP 402 to obtain a fresh representation of resourceA.

Block 420 occurs when the mirrored resource does not meet freshness requirements, which initiates on-demand refresh. At step 421, if Mirror Server 404 does not find a mirrored resourceA that satisfies the specified freshness requirement, then it may optionally return an acknowledgement to Client 406 such that Client 406 is not required to block and wait while Mirror Server 404 attempts to obtain a fresh resource from SEP 402. This acknowledgement may include a status to indicate that the request was received and is still being processed since Mirror Server 404 did not have a locally hosted mirrored version of resourceA that met Client 406's freshness preference or requirement. The acknowledgement may also include Mirror Server 404 callback address (e.g., URI) that may be used by Client 406 to receive a fresh resourceA when it becomes available. For example, Client 406 may periodically poll or observe this address and receive a fresh resourceA when Mirror Server 404 is either able to obtain a fresh resourceA from SEP 402 or an error condition if Mirror Server 404 is unsuccessful in obtaining a fresh resourceA from SEP 402. Alternatively, Mirror Server 404 may choose to process the request in a blocking manner in which case it would not return an acknowledgement to Client 406 in this step. Instead it would hold off responding to Client 406 until Step 426 in this procedure.

With continued reference to FIG. 18, at step 422, Mirror Server 404 initiates a request to SEP 402 requesting a fresh resourceA. This request may be delivered to SEP 402 using a GET request. Mirror Server 404 may initiate a retrieve request targeting the URI specified by SEP 402 in step 410. This request may also contain an optional freshness parameter which may be configured with the same timestamp as the one in the original request from Client 406. At step 423, upon receiving the request of step 422, SEP 402 may process the request. SEP 402 may analyze the specified address and a freshness parameter, if present in the request, to determine which content is being requested and in turn prepare a resourceA to return to Mirror Server 404 in the retrieve response. At step 424, SEP 402 may update Mirror Server 404 with a fresh resourceA in the retrieve response. At step 425, if a fresh resourceA is successfully returned, then Mirror Server 404 stores a local version of the fresh resourceA such that it may be leveraged to service future requests or be used for purposes such as charging and analytics as well. Mirror Server 404 may also optionally assign a corresponding timestamp to keep track of when the resourceA was created in Mirror Server 404. At step 426, if a fresh resourceA is successfully published to Mirror Server 404, then it is returned to Client 406 otherwise an error is returned instead.

Similarly, Mirror Server 404 may support freshness-based request re-targeting in which the Mirror Service may evaluate the payload of a PUT or CREATE request to determine if the semantic resource representation is the same as the mirrored resource representation. If the same, Mirrored Server 404 may deem the PUT or CREATE operation as stale and not re-target the request to the device. If not the same, Mirror Server 404 may deem the request fresh and re-target it to the device to service.

Without unduly limiting the scope, interpretation, or application of the claims appearing herein, below are exemplary technical effects of one or more of the examples disclosed herein associated with how requests are processed in an M2M/IoT environment, among other things. A technical effect of one or more of the examples disclosed herein, may be a reduced load on IoT devices, since devices hosting a Content Sourcing App or a Request Receiving App are usually triggered or notified when a corresponding Content Requesting App would prefer a version of the resource that is fresher than the version stored in the service layer or a Request Initiating App would prefer to re-target a request to a particular device. Another technical effect of one or more of the examples disclosed herein is that, by comparison to conventional implementations, Service Layer may provide increased availability to fresh content that Content Requesting Apps would not otherwise have access to. This removes the limitation that Content Requesting Apps my only access content that is stored in Service Layer. This creates a more flexible and powerful service layer framework to support more use cases which require fresh content. Another technical effect of one or more of the examples disclosed herein is that, by comparison to conventional implementations, a Device hosting a Content Sourcing App or a Request Receiving App may be allowed to sleep until a Content Requesting App or a Request Initiating App wants to access fresh content not currently hosted by the Service Layer or update content to a state that is different than its current state. Lack of a need for fresh content allows devices to stay asleep.

Another technical effect may be to save on network bandwidth by reducing the number of message and maybe save battery life of for a receiving device (e.g., actuating or other end device of FIG. 8) because it is not processing unnecessary requests (e.g., duplicate requests). In an example, if there are multiple users trying to unlock the same door, then only one of them needs to unlock the door, the other requests trying to unlock the door can really be seen as duplicate and they are really not "fresh," so they can be filtered. And by doing that the service layer provides value-add. There may be some comparison of past commands and a determination whether to forward or retarget the request down to an actuator type device.

Figure 20:
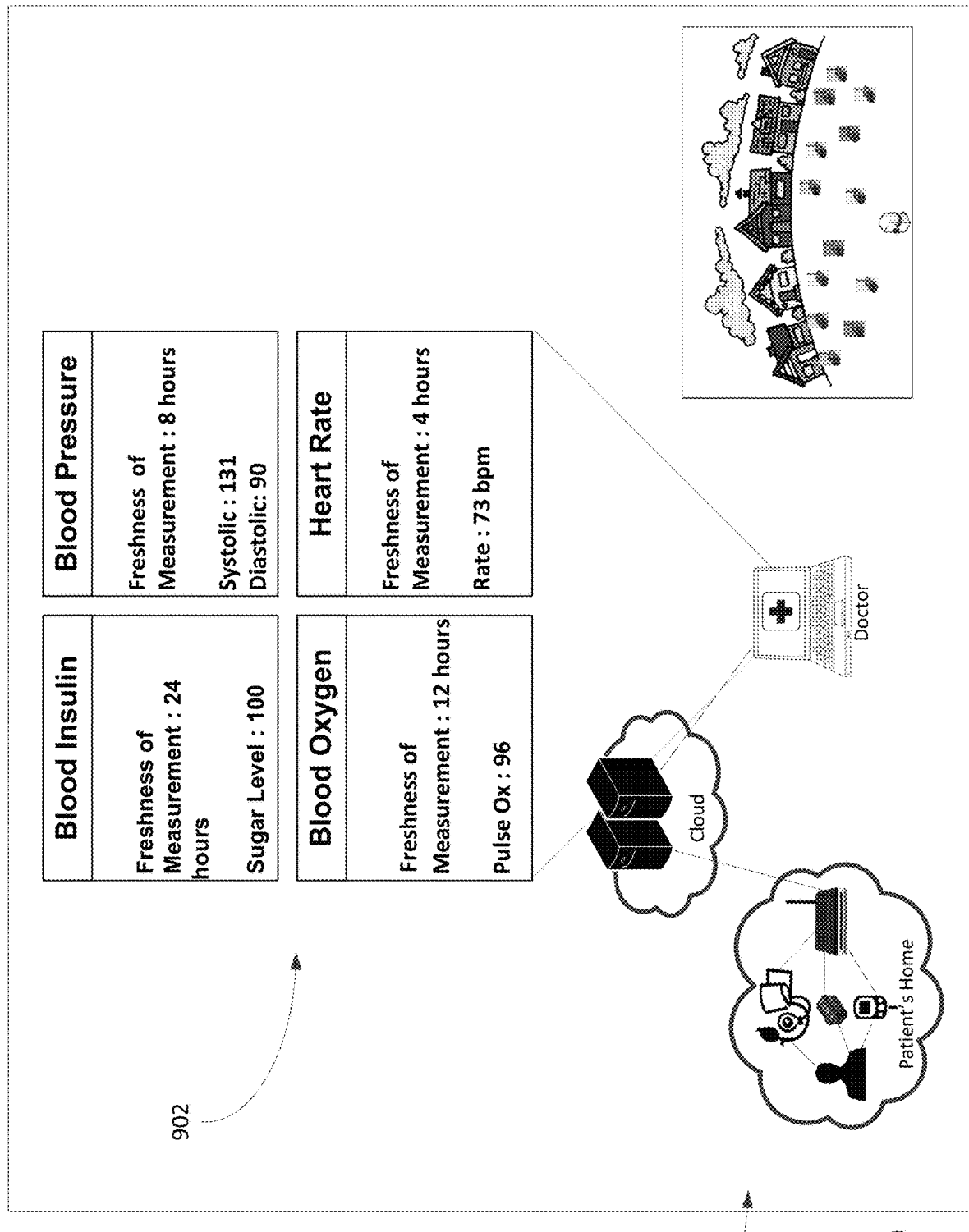
FIG. 20 illustrates an exemplary display (e.g., graphical user interface) that may be generated based on the methods and systems discussed herein.

FIG. 20 illustrates an exemplary display (e.g., graphical user interface) that may be generated based on the methods and systems discussed herein, such as freshness-based content retrieval service. Display interface 901 (e.g., touch screen display) may provide text in block 902 associated with request processing, including results. Portions of block 902, when selected, may give additional information such as the parameters of Table 1 through Table 6. In another example, progress of any of the steps (e.g., sent messages or success of steps) discussed herein may be displayed in block 902. In addition, graphical output 903 may be displayed on display interface 901. Graphical output 903 may be the topology of the devices in request processing, a graphical output of the progress of any method or systems discussed herein, or the like. Display interface 901 may be implemented for configuring or programming the required freshness of content discovered and retrieved from devices discussed herein. For example, in the use case with reference to FIG. 6, a doctor may be provided with a user interface via application 121 which allows the doctor to specify the preferred or required freshness of the blood insulin, blood pressure, blood oxygen and heart rate readings for a particular patient as shown in FIG. 20.

Figure 21A:
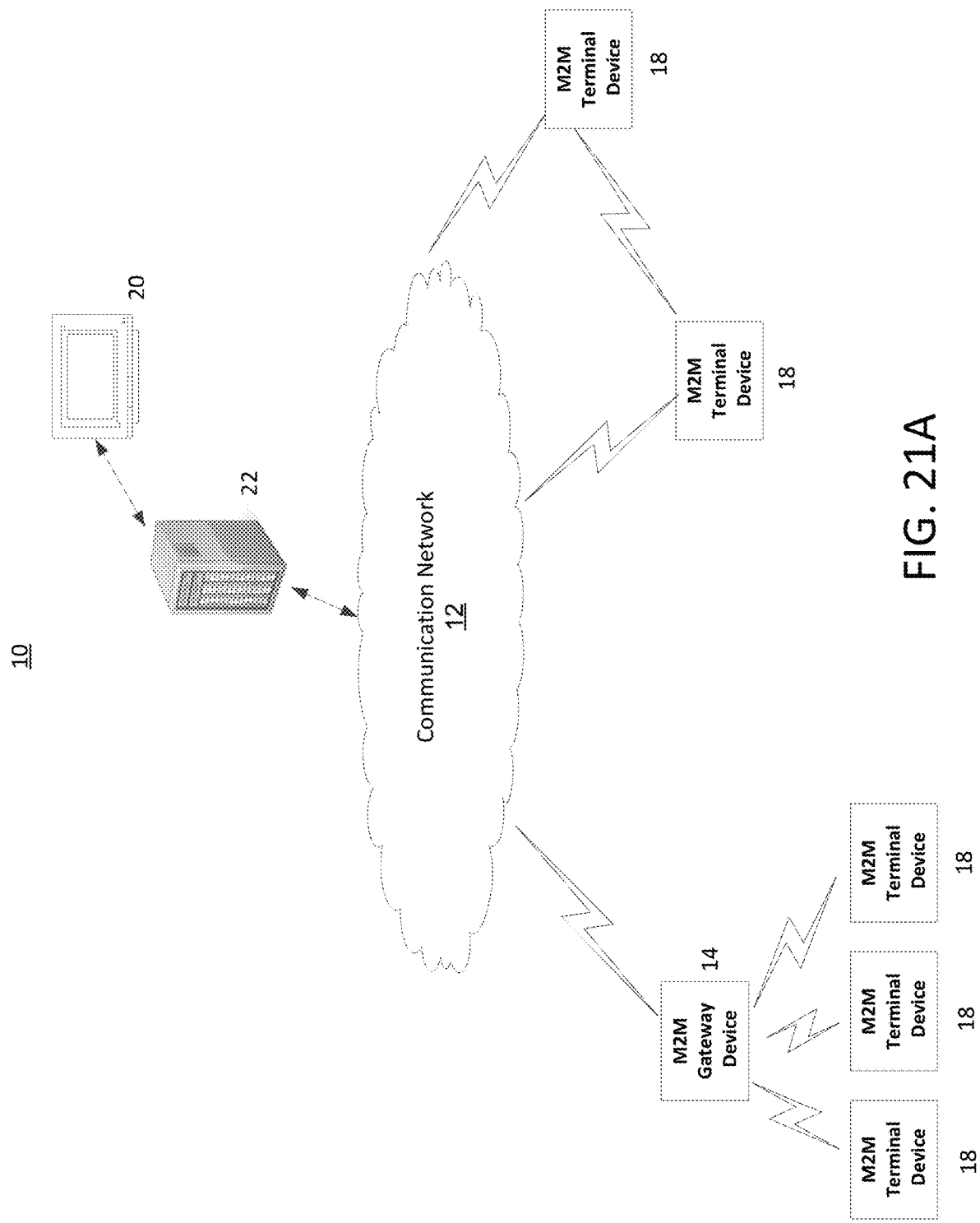
FIG. 21A is a system diagram of an example machine-to-machine (M2M) or Internet of Things (IoT) communication system in which the disclosed subject matter may be implemented.

FIG. 21A is a diagram of an example machine-to machine (M2M), Internet of Things (IoT), or Web of Things (WoT) communication system 10 in which one or more disclosed concepts associated with request processing for the service layer (e.g., FIG. 6-FIG. 20 and accompanying discussion). Generally, M2M technologies provide building blocks for the IoT/WoT, and any M2M device, M2M gateway or M2M service platform may be a component of the IoT/WoT as well as an IoT/WoT service layer, etc.

As shown in FIG. 21A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 21A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 21B:
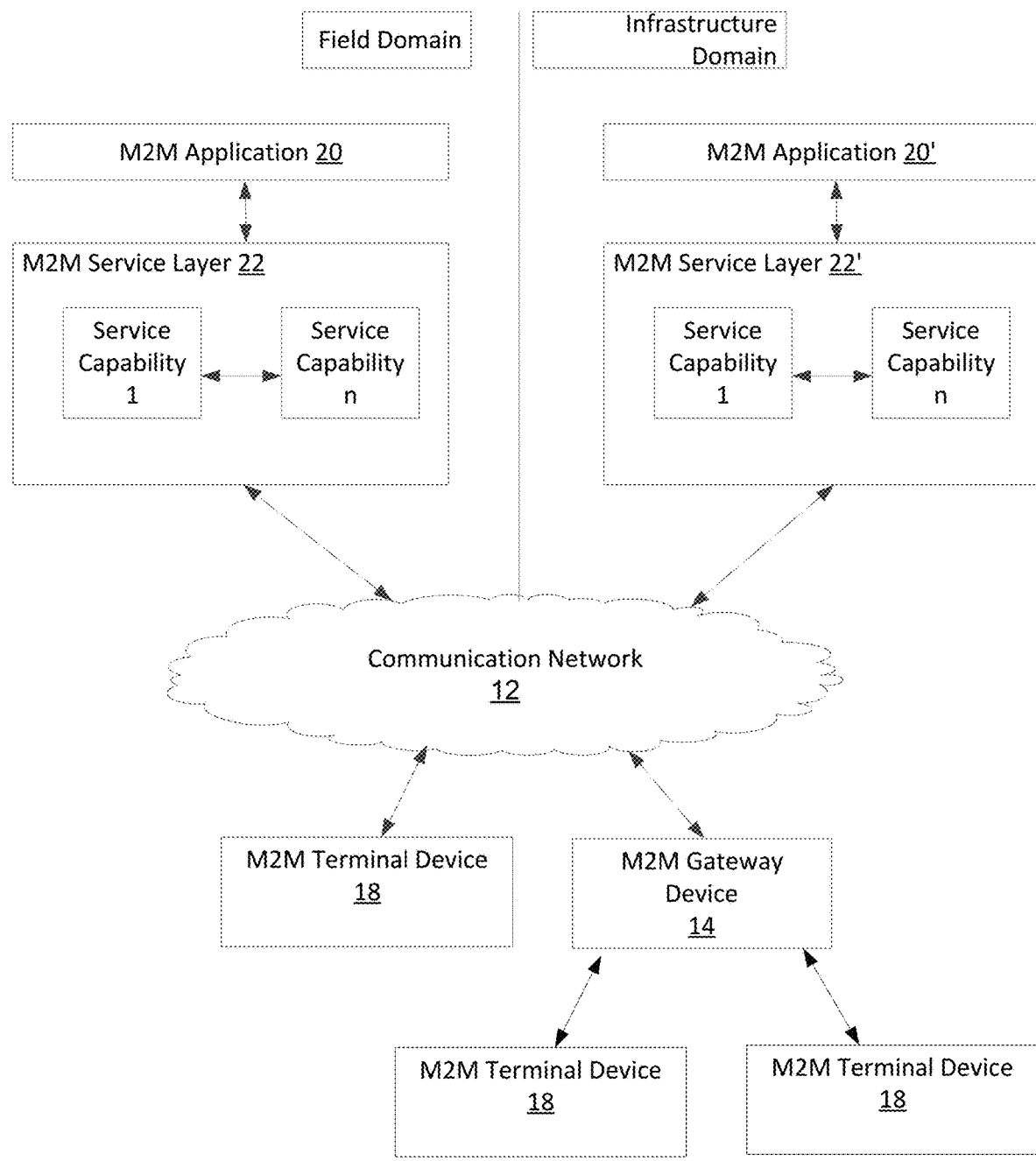
FIG. 21B is a system diagram of an example architecture that may be used within the M2M/IoT communications system illustrated in FIG. 21A.

Referring to FIG. 21B, the illustrated M2M service layer 22 (e.g., Service Layer 204) in the field domain provides services for the M2M application 20 (e.g., request receiving app 203 or content sourcing app 202), M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 21B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using request processing among other things, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The request processing methods and systems of the present application may be implemented as part of a service layer. The service layer (e.g. service layer 204) is a middleware layer that supports value-added service capabilities through a set of application programming interfaces (APIs) and underlying networking interfaces. An M2M entity (e.g., an M2M functional entity such as a device, gateway, or service/platform that is implemented on hardware) may provide an application or service. Both ETSI M2M and oneM2M use a service layer that may contain the request processing among other things of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). Further, the request processing methods and systems of the present application can be implemented as part of an M2M network that uses a Service Oriented Architecture (SOA) and/or a resource-oriented architecture (ROA) to access services such as the request processing methods and systems of the present application.

As discussed herein, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications r various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (i.e., functional interfaces between such functional entities) in order for them to use such capabilities or functionalities.

Figure 21C:
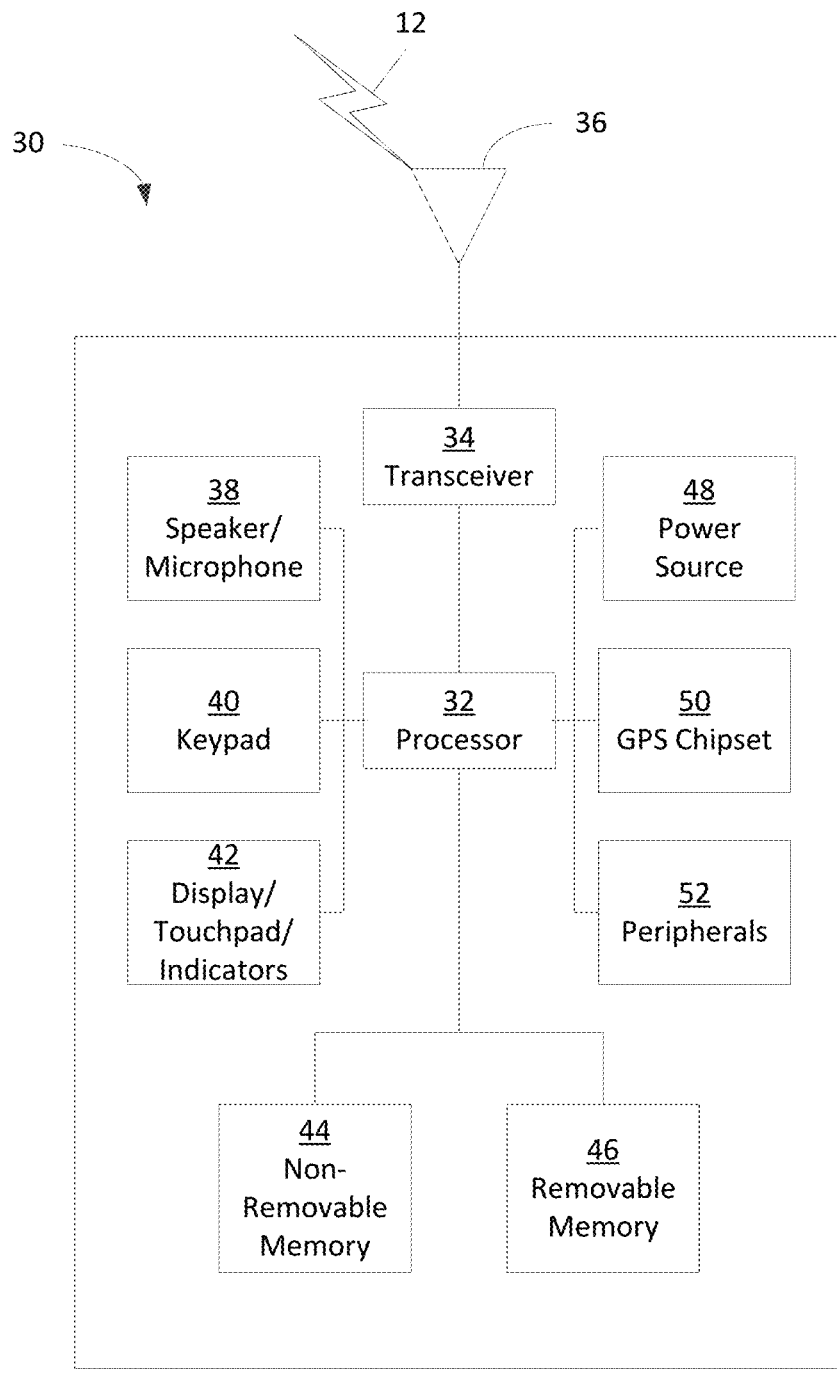
FIG. 21C is a system diagram of an example M2M/IoT terminal or gateway device that may be used within the communications system illustrated in FIG. 21A.

FIG. 21C is a system diagram of an example M2M device 30, such as an M2M terminal device 18 or an M2M gateway device 14 for example. As shown in FIG. 21C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 may be an exemplary implementation that performs the disclosed systems and methods for request processing. Content Sourcing App 202, Service Layer 204, Content Requesting App 206, Request Receiving App 203, Request Initiating App 205, Control App 141, and the like may reside on devices with features like M2M device 30. Content Sourcing App 202, Service Layer 204, Content Requesting App 206, Request Receiving App 203, Request Initiating App 205, Control App 141 may often reside on M2M terminal device 18. Mirror Server 404, Service Layer 204, CSE 304, and the like may often reside on M2M gateway device 14.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 21C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, the transmit/receive element 36 may be an antenna configured to transmit and/or receive RF signals. The transmit/receive element 36 may support various networks and air interfaces, such as WLAN, WPAN, cellular, and the like. In an example, the transmit/receive element 36 may be an emitter/detector configured to transmit and/or receive IR, UV, or visible light signals, for example. In yet another example, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 21C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the request processing methods in some of the examples described herein are successful or unsuccessful (e.g., device triggering, freshness, etc.), or otherwise indicate a status of request processing systems and methods and associated components. The control lighting patterns, images, or colors on the display or indicators 42 may be reflective of the status of any of the method flows or components in the FIG.'s illustrated or discussed herein (e.g., FIG. 9 through FIG. 12 and FIG. 14 through FIG. 18, etc.). Disclosed herein are messages and procedures of service layer associated request processing. The messages and procedures may be extended to provide interface/API for users to request resource-related resources via an input source (e.g., speaker/microphone 38, keypad 40, or display/touchpad 42) and request, configure, or query service layer associated request processing resources, among other things that may be displayed on display 42.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled to other peripherals 52, which may include one or more software or hardware modules that provide additional features, functionality or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

Figure 21D:
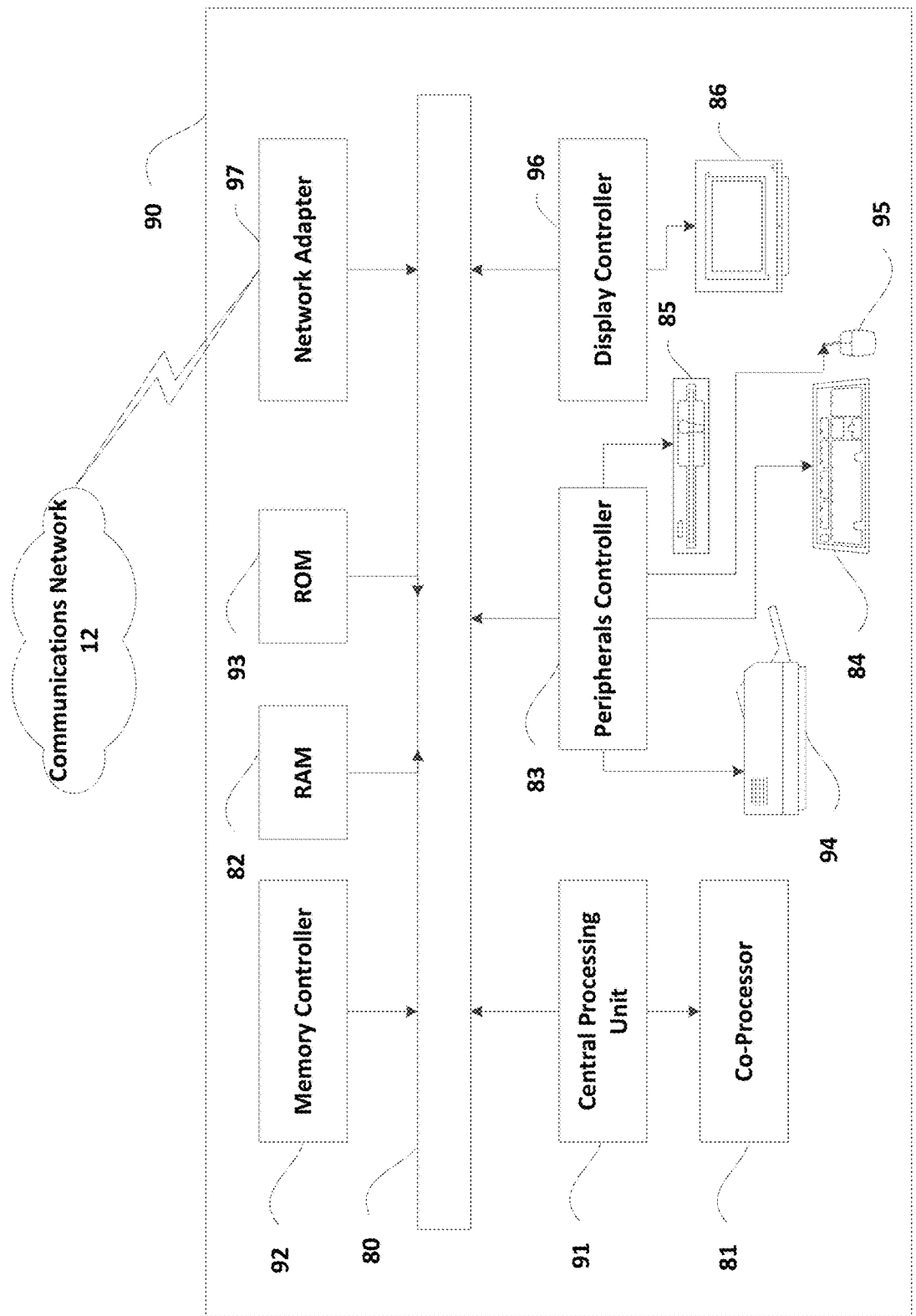
FIG. 21D is a block diagram of an example computing system in which aspects of the communication system of FIG. 21A may be embodied.

FIG. 21D is a block diagram of an exemplary computing system 90 on which, for example, the M2M service platform 22 of FIG. 21A and FIG. 21B may be implemented. Computing system 90 (e.g., M2M terminal device 18 or M2M gateway device 14) may comprise a computer or server and may be controlled primarily by computer readable instructions by whatever means such instructions are stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for request processing, such as freshness of content, re-targeting, and triggering.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 21A and FIG. 21B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals per se. As evident from the herein description, storage media should be construed to be statutory subject matter. Computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred methods, systems, or apparatuses of the subject matter of the present disclosure—request processing in the service layer—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

Fresh Content may be time-based or state-based, among other things. For example, time-based fresh content may be associated with service layer hosted content that has a creation date that is newer than the data and time specified in a freshness parameter included in a content retrieval or discovery request. State-based fresh content may be associated with a request to update service layer hosted content to a semantic state that is different than its current semantic state.

Methods, systems, and apparatuses, among other things, as described herein may provide for means for managing freshness of content for the service layer (request processing in the service layer). A method, system, computer readable storage medium, or apparatus has means for receiving a message from a requesting application, the message comprising a request to obtain content associated with a service and a freshness period for the content associated with the service; determining that the freshness period of the content is outside an acceptable threshold period based on a requirement in the message; and responsive to determining that the freshness period of the content is outside the acceptable threshold period: 1) sending a non-blocking response to the requesting application, and 2) sending a request message to a content source application, based on point-of-contact information, to obtain the updated content of the service that is within the acceptable threshold. The method, system, computer readable storage medium, or apparatus has means for determining a schedule by which the content is required to be updated by the service layer device based on an analysis of the freshness period for the content associated with the service along with freshness periods for the content associated with a plurality of other services. The request message to the content source application may comprise a schedule by which the content is required to be updated by the service layer device. The non-blocking response may comprise a callback address that is used by the requesting application to subscribe to receive content within the freshness period when the content becomes available. The request message to the content source application may comprise a created-after parameter that corresponds to the freshness period. The method, system, computer readable storage medium, or apparatus has means for determining a schedule by which the content is required to be updated by the apparatus based on an analysis of the freshness period for the content in the message along with freshness periods for the content associated in a plurality of other messages. The point-of-contact information may comprise a uniform resource identifier. All combinations in this paragraph (including the removal or addition of steps) are contemplated in a manner that is consistent with the other portions of the detailed description.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. An apparatus for managing freshness of content for a service layer, the apparatus comprising:
  a processor; and
  a memory coupled with the processor, the memory comprising executable instructions stored thereon that when executed by the processor cause the processor to effectuate operations comprising:
    receiving a first message, the first message comprising a request to store on the apparatus a re-targeting policy for a content source application, wherein the re-targeting policy includes information of a point-of-contact for privileges of the content source application, wherein the privileges of the content source application define one or more content requesting applications whose received requests are allowed to be retargeted to the content source application;
    receiving a second message from the content source application, the second message comprising a request to store content in a first service layer resource;
    receiving a third message from a content requesting application, the third message comprising a request to obtain content from the content source application that is stored in the first service layer resource and a freshness period for the content, wherein the freshness period is an allowed age of the content stored in the first service layer resource;

determining that an age of the content stored in the first service layer resource is older than the allowed age specified in the freshness period of the third message;

responsive to determining that the age of the content is older than the allowed age specified in the freshness period of the third message, determining, based on the re-targeting policy, that the received request of the content requesting application is allowed to be re-targeted to the content source application, and sending a fourth message to request updated content from the content source application based on point-of-contact information;

receiving a fifth message with updated content from the content sourcing application; and sending a response to the content requesting application that includes the updated content.

2. The apparatus of claim 1, wherein the privileges of the re-targeting policy comprise identifiers of content source applications allowed to re-target requests to content source applications.

3. The apparatus of claim 1, wherein the third message from the content requesting application comprises an identifier of the content requesting application.

4. The apparatus of claim 1, wherein the third message comprises a priority that the content source application uses to prioritize when the content source application provides fresh content.

5. The apparatus of claim 1, the operations further comprising determining that content of the first message, second message, or the third message is allowed to be re-targeted to the content source application by checking that an identifier of the content requesting application is present in the privileges of the re-targeting policy.

6. The apparatus of claim 1, wherein the information of the point-of-contact comprises a uniform resource identifier.

7. The apparatus of claim 1, wherein the service layer is a service supporting service capabilities through a set of application programming interfaces (APIs).

8. A method for managing freshness of content for a service layer, the method comprising:

receiving a first message, the first message comprising a request to store a re-targeting policy for a content source application, wherein the re-targeting policy includes information of a point-of-contact for privileges of the content source application, wherein the privileges of the content source application define one or more content requesting applications whose received requests are allowed to be retargeted to the content source application;

receiving a second message from the content source application, the second message comprising a request to store content in a first service layer resource;

receiving a third message from a content requesting application, the third message comprising a request to obtain content from the content source application that is stored in the first service layer resource and a freshness period for the content, wherein the freshness period is an allowed age of the content stored in the first service layer resource;

determining that an age of the content stored in the first service layer resource is older than the allowed age specified in the freshness period of the third message;

responsive to determining that the age of the content is older than the allowed age specified in the freshness period of the third message, determining, based on the re-targeting policy, that the received request of the content requesting application is allowed to be re-targeted to the content source application, and sending a fourth message to request updated content from the content source application based on point-of-contact information;

receiving a fifth message with updated content from the content sourcing application; and sending a response to the content requesting application that includes the updated content.

9. The method of claim 8, wherein the privileges of the re-targeting policy comprise identifiers of content source applications allowed to re-target requests to content source applications.

10. The method of claim 8, wherein the third message from the content requesting application comprises an identifier of the content requesting application.

11. The method of claim 8, wherein the third message comprises a priority that the content source application uses to prioritize when the content source application provides fresh content.

12. The method of claim 8, further comprising determining that content of the first message, second message, or the third message is allowed to be re-targeted to the content source application by checking that an identifier of the content requesting application is present in the privileges of the re-targeting policy.

13. The method of claim 8, wherein the information of the point-of-contact comprises a uniform resource identifier.

14. The method of claim 8, wherein the service layer is a service supporting service capabilities through a set of application programming interfaces (APIs).

15. The method of claim 14, wherein the service is provided as a middleware service for internet of things (IoT) services.

16. A method for managing freshness of content for a service supporting through a set of Application Programming Interfaces (APIs), the method comprising:

receiving a first message, the first message comprising a request to store a re-targeting policy for a content source application, wherein the re-targeting policy includes information of a point-of-contact of the content source application and privileges defining one or more content requesting applications whose received requests are allowed to be retargeted to the content source application;

receiving a second message from the content source application, the second message comprising a request to store content in a first service resource;

receiving a third message from a content requesting application, the third message comprising a request to obtain content from the content source application that is stored in the first service resource and a freshness period for the content, wherein the freshness period is an allowed age of the content stored in the first service resource;

determining that an age of the content stored in the first service resource is older than the allowed age specified in the freshness period of the third message;

responsive to determining that the age of the content is older than the allowed age specified in the freshness period of the third message, determining, based on the re-targeting policy, that the received request of the content requesting application is allowed to be re-targeted to the content source application, and sending a fourth message to request updated content from the content source application based on point-of-contact information;

receiving a fifth message with updated content from the content sourcing application; and sending a response to the content requesting application that includes the updated content.

17. The method of claim 16, wherein the service is provided as a middleware service in a service layer for internet of things (IoT) services, the service layer located on top of network protocol stacks.

18. The method of claim 17, wherein the service layer is defined according to ETSI/oneM2M standards.

19. The method of claim 16, wherein the third message comprises a priority that the content source application uses to prioritize when the content source application provides fresh content.

20. The method of claim 16, wherein the third message from the content requesting application comprises an identifier of the content requesting application.

* * * * *